United States Patent
Honma

(10) Patent No.: US 7,305,169 B2
(45) Date of Patent: Dec. 4, 2007

(54) FIBER CLEAVER

(75) Inventor: Toshihiko Honma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 122 days.

(21) Appl. No.: 10/551,925

(22) PCT Filed: Jan. 20, 2005

(86) PCT No.: PCT/JP2005/000636

§ 371 (c)(1),
(2), (4) Date: Oct. 5, 2005

(87) PCT Pub. No.: WO2005/088370

PCT Pub. Date: Sep. 22, 2005

(65) Prior Publication Data

US 2006/0263028 A1    Nov. 23, 2006

(30) Foreign Application Priority Data

Mar. 15, 2004  (JP)  ............................. 2004-073028
Apr. 26, 2004  (JP)  ............................. 2004-130280

(51) Int. Cl.
*G02B 6/00* (2006.01)

(52) U.S. Cl. ........................................ 385/136; 225/93
(58) Field of Classification Search ................ 385/134, 385/136, 137, 147; 225/93, 95, 96.5
See application file for complete search history.

(56) References Cited

U.S. PATENT DOCUMENTS 6,754,426 B2 *   6/2004   Lee et al. ................... 385/136

(Continued)

FOREIGN PATENT DOCUMENTS

EP          0 926 518 A2     6/1999

(Continued)

OTHER PUBLICATIONS

Translation of International Preliminary Report on Patentability and Written Opinion of the International Search Authority issued in corresponding International Application No. PCT/JP2005/000636, dated Dec. 14, 2006.

(Continued)

*Primary Examiner*—Quyen P Leung
(74) *Attorney, Agent, or Firm*—McDermott Will & Emery LLP

(57) ABSTRACT

A fiber cleaver is provided which is capable of cleaving a glass fiber portion in a short time without depending on a particular working environment. The fiber cleaver comprises a holding member for holding a glass fiber portion of an optical fiber, a cutter for affording a scratch to the glass fiber portion which is held by the holding member, an elastic member or spring for moving the cutter, and a slider engaging member for maintaining the elastic member or spring in a state of elastic deformation. Also provided is a fiber cleaver comprising a holding member for holding the glass fiber portion of an optical fiber, a cutter for affording a scratch to the glass fiber portion held by the holding member, and a holder engaging part for holding a holder that holds an optical fiber at its part having a protective covering. The holder engaging part has a first holder engaging member for pushing and holding the holder in a direction parallel to a movement direction of the cutter.

26 Claims, 19 Drawing Sheets

U.S. PATENT DOCUMENTS 7,025,239 B2 * 4/2006 Itano et al. .................... 225/95
2005/0169594 A1 * 8/2005 Song .......................... 385/134

FOREIGN PATENT DOCUMENTS

| JP | 01-293307 | 11/1989 |
| JP | 09-090136 | 4/1997 |
| JP | 11-248945 | 9/1999 |
| JP | 11-326646 | 11/1999 |
| JP | 2003-165740 | 6/2003 |
| JP | 2003-165740 A | 6/2003 |
| KR | 10-2004-0018909 | 3/2004 |

OTHER PUBLICATIONS

Japanese Office Action for Patent Application No. 2006-515306, Dispatch Date: Jul. 19, 2006.

Chinese Office Action, with English translation, issued in Chinese Patent Application No. CN 2005800000570, mailed Jul. 27, 2007.

* cited by examiner

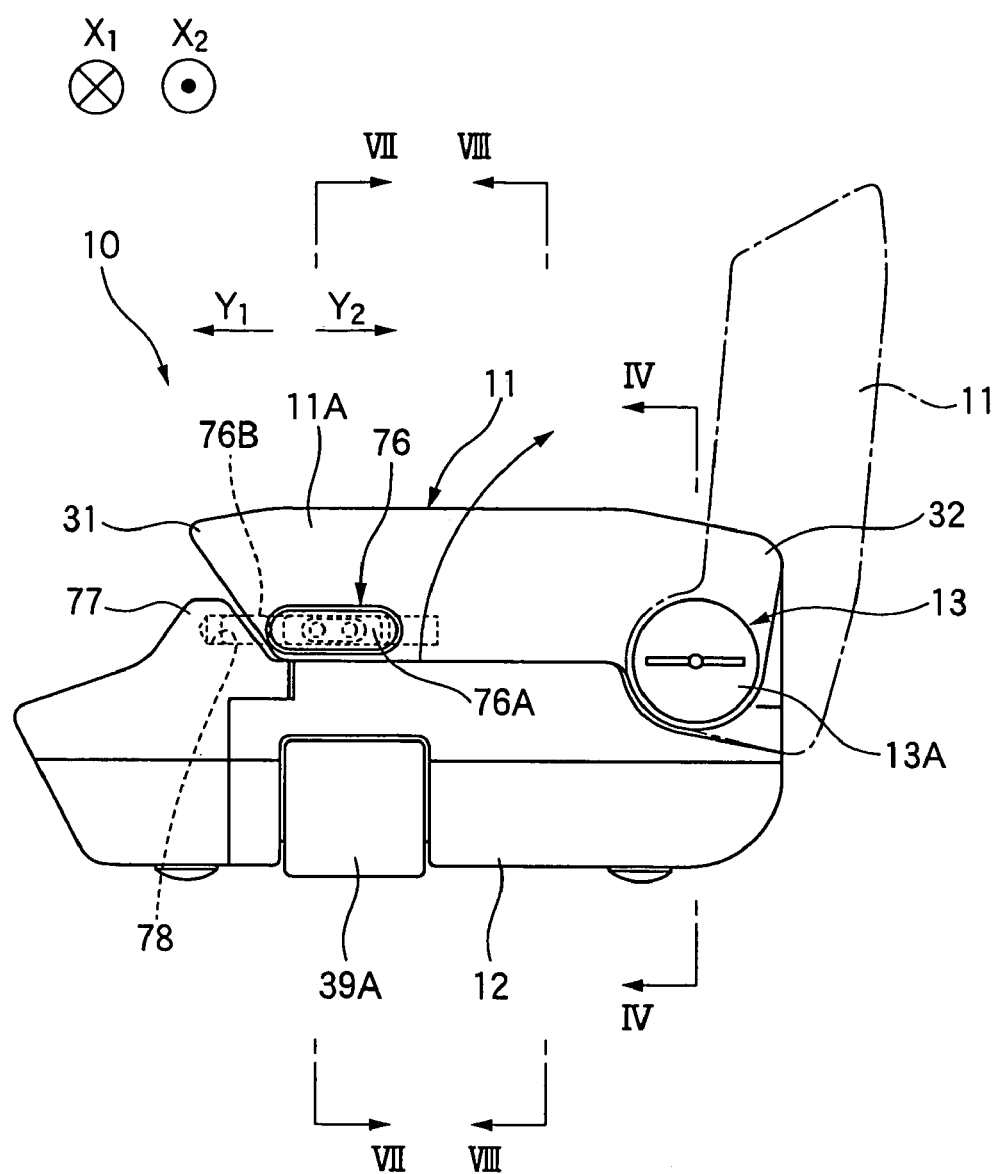
[FIG. 2]

[FIG. 3]
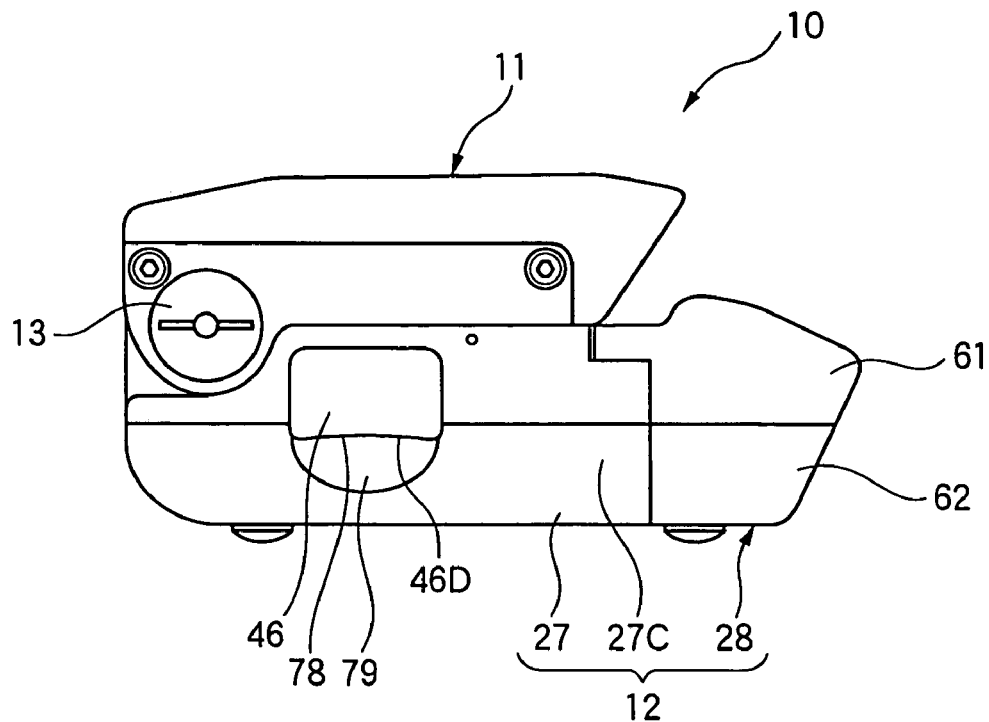
[FIG. 4]
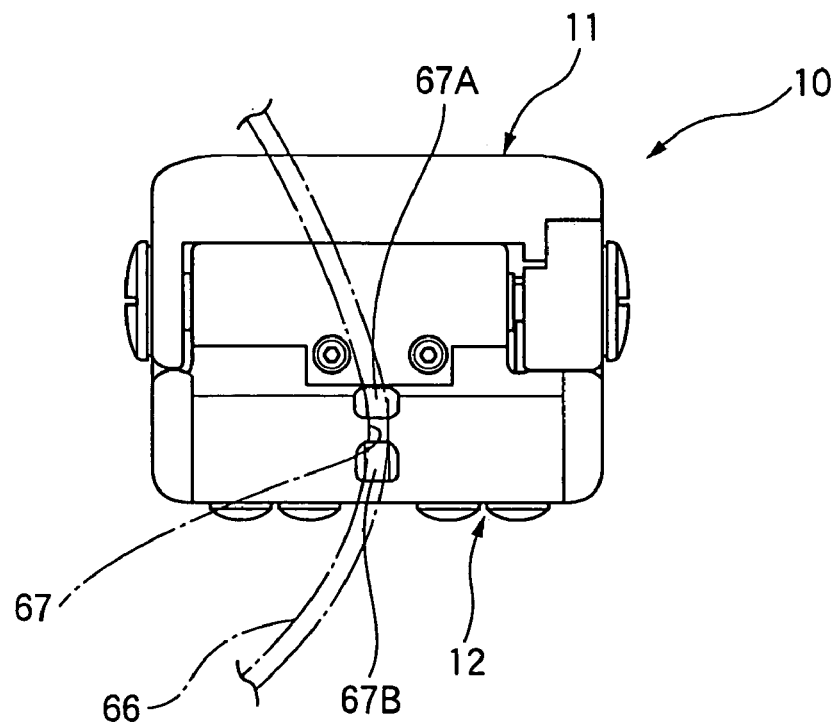

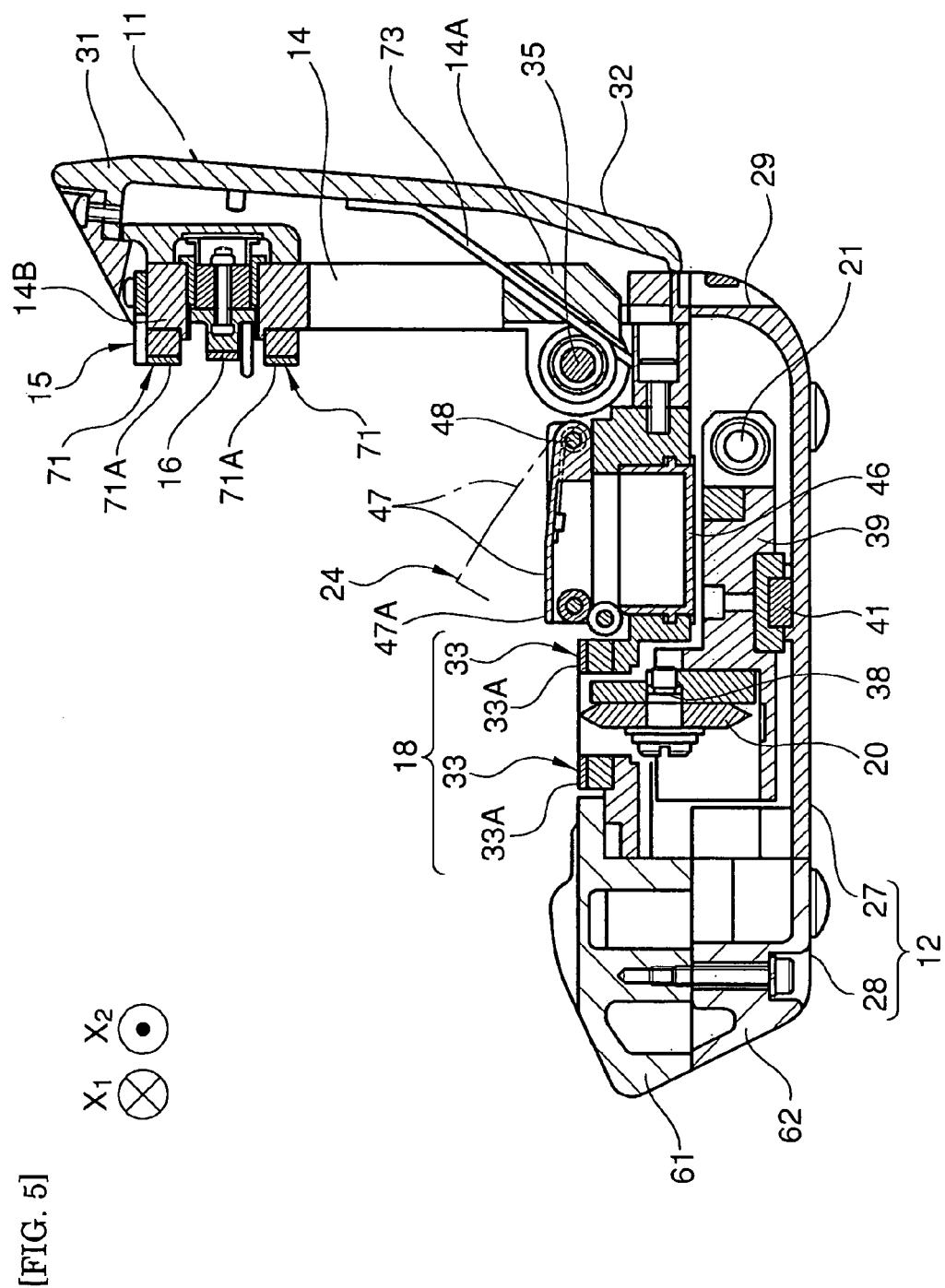
[FIG. 5]

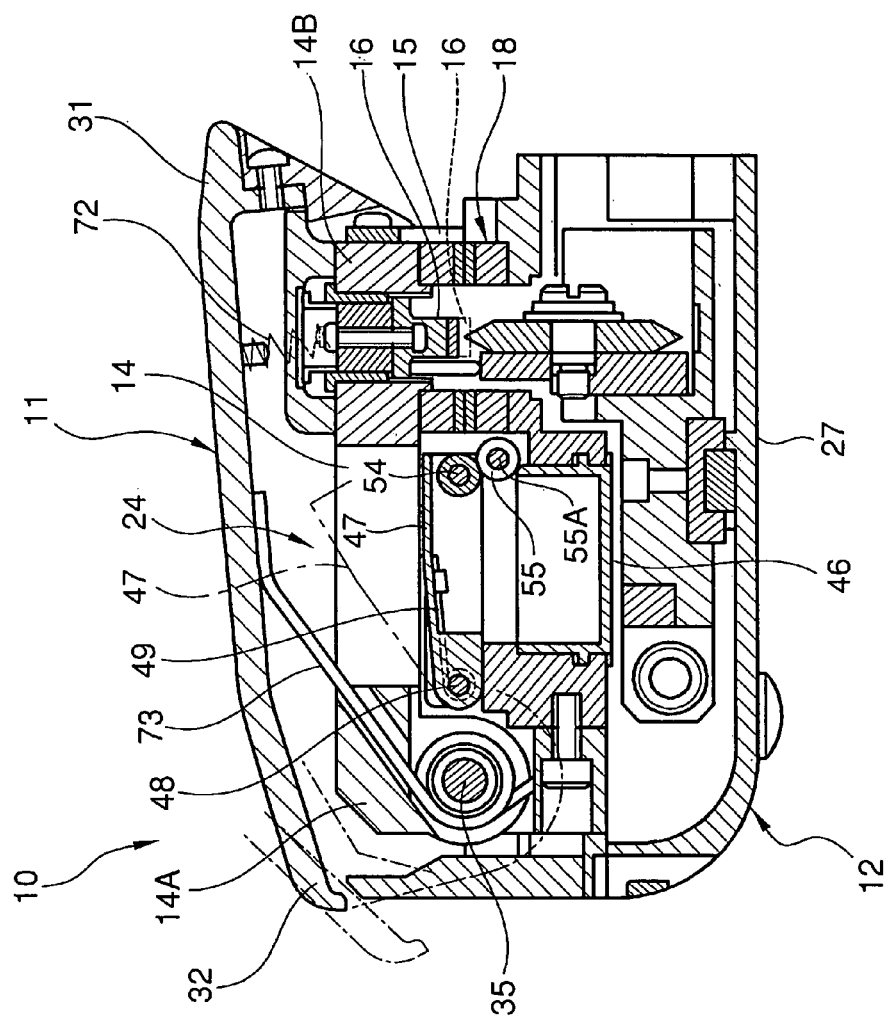
[FIG. 6]

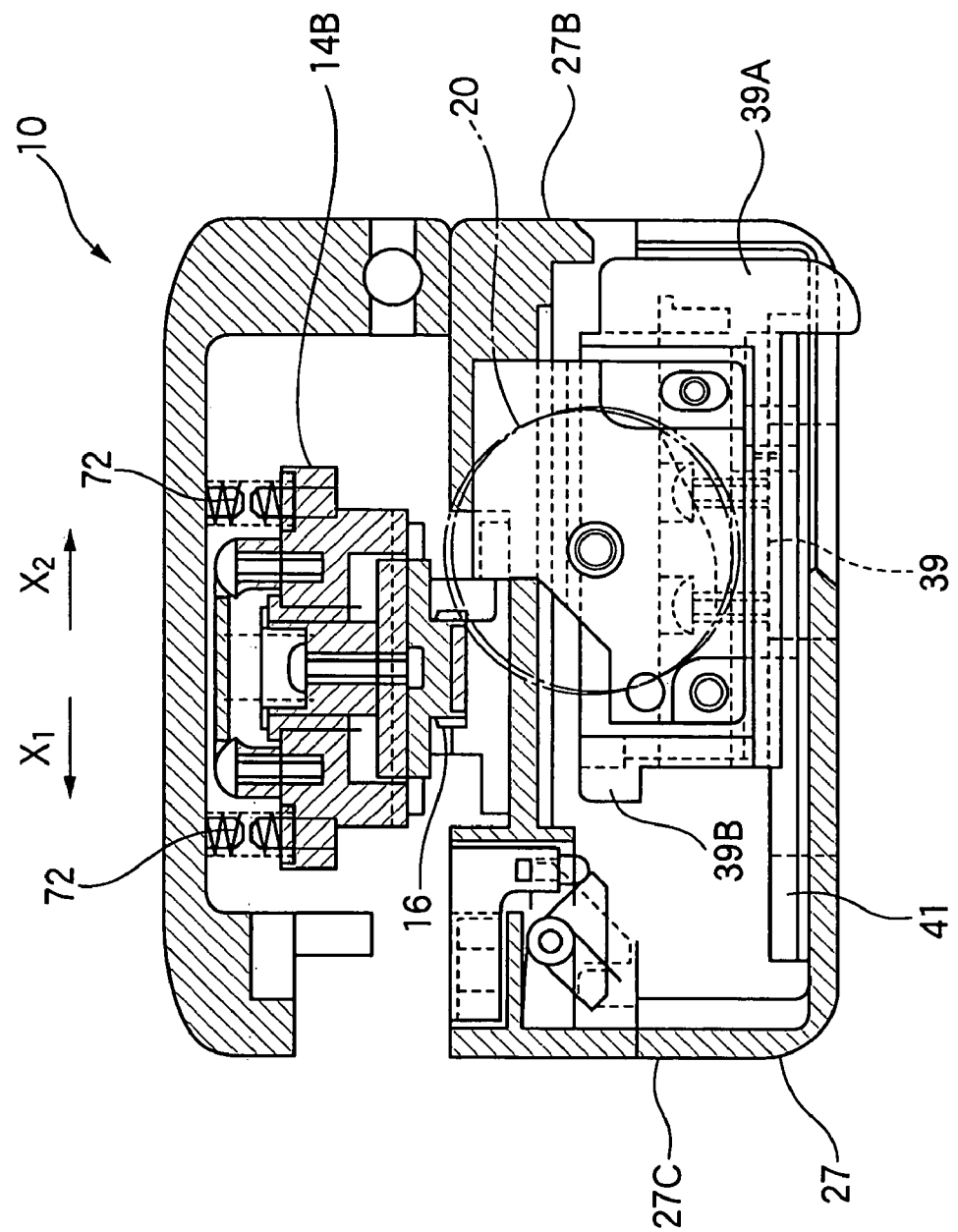
[FIG. 7]

[FIG. 9]
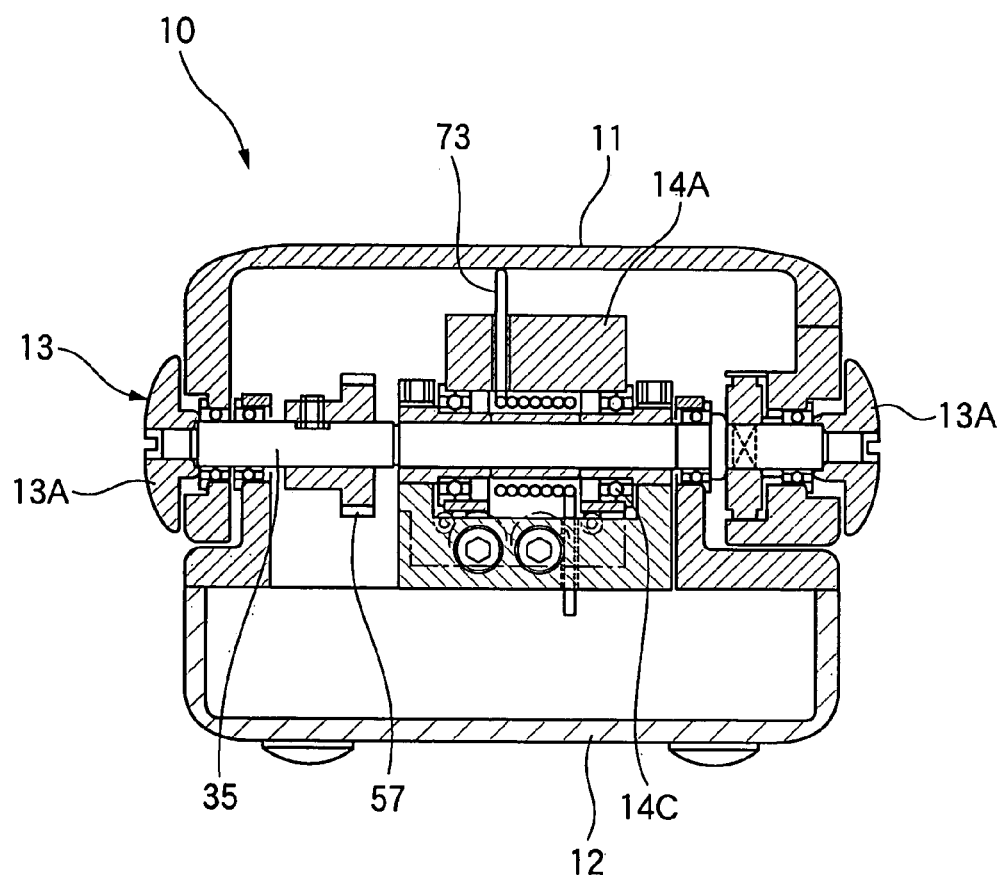

[FIG. 10]
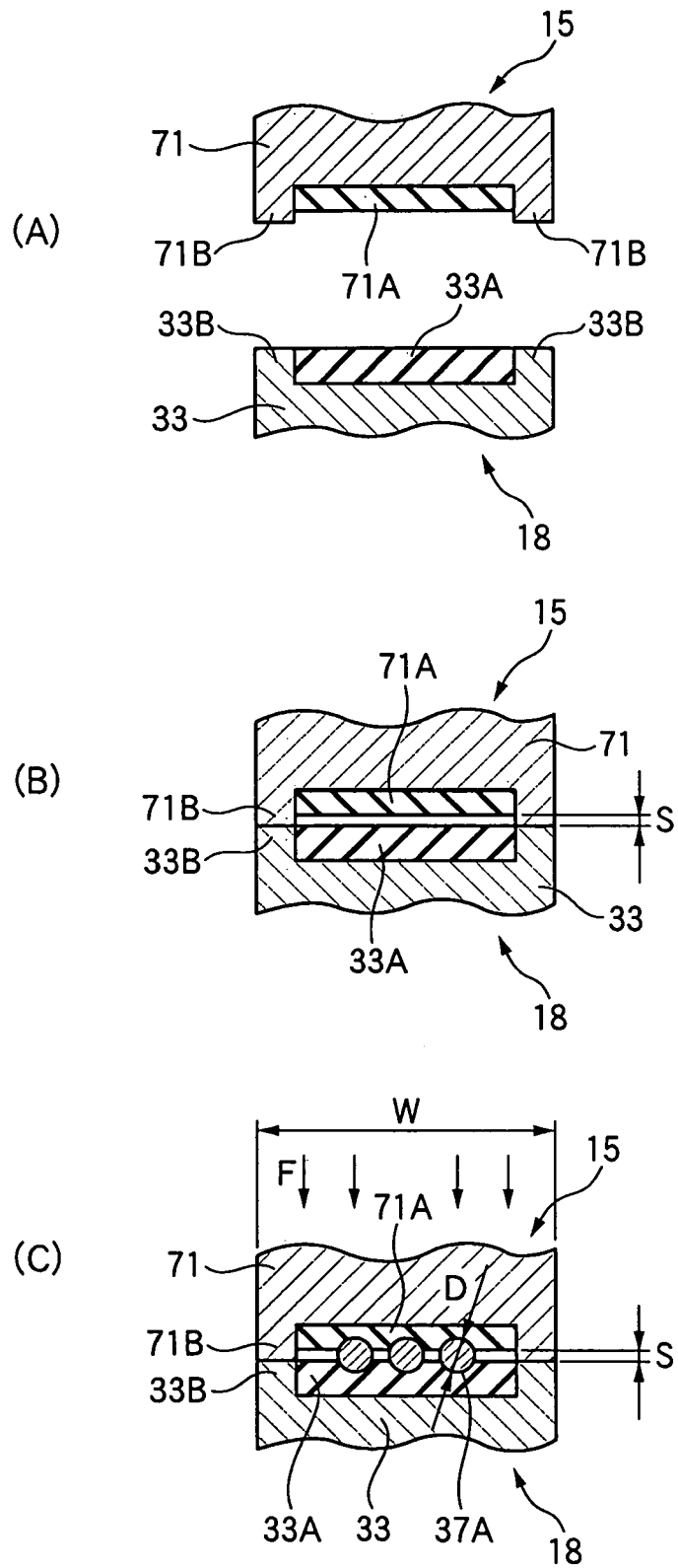

[FIG. 11]
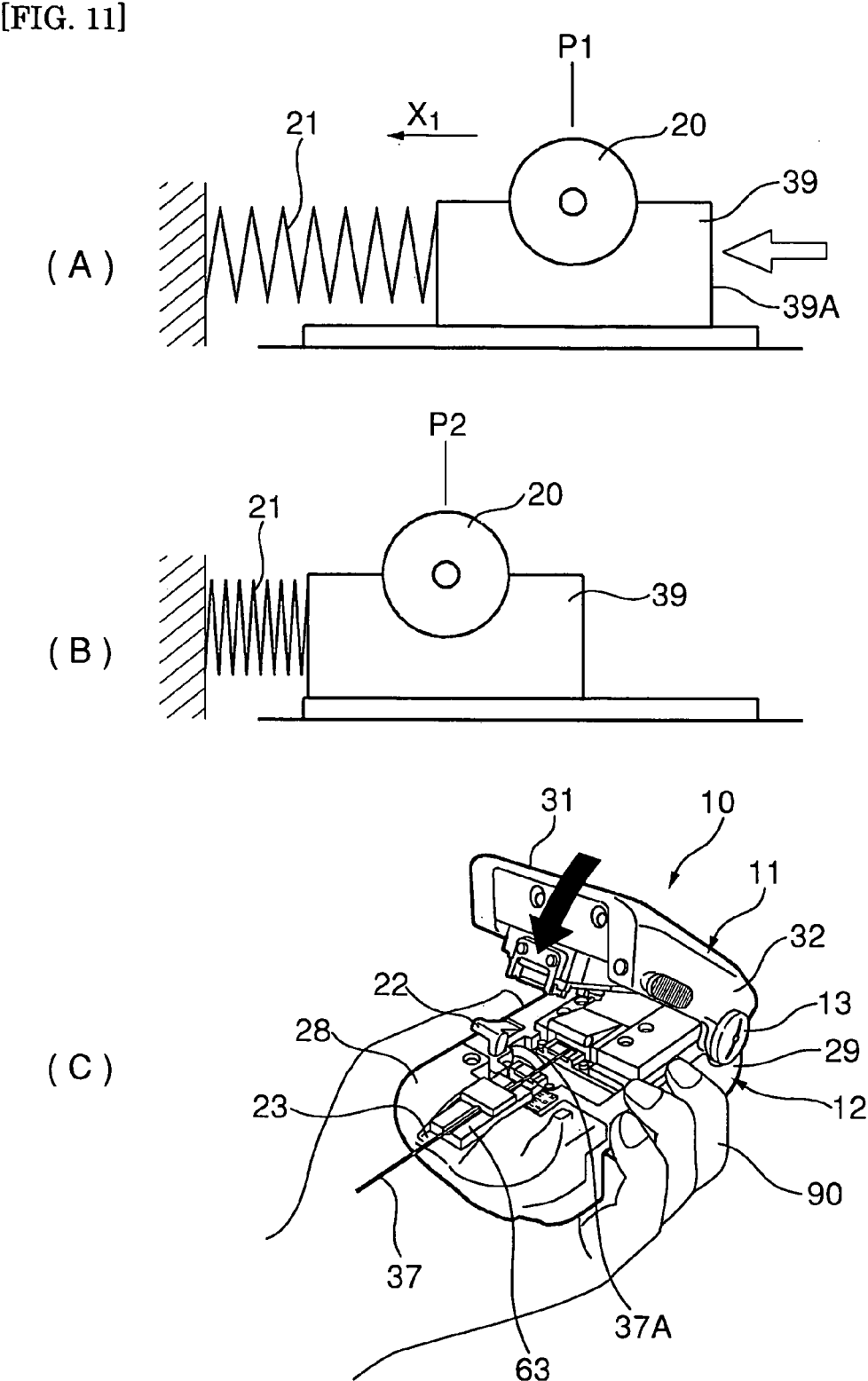

[FIG. 12]
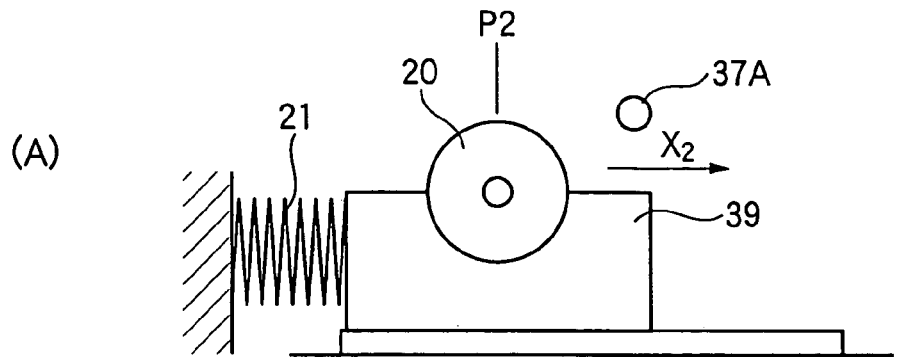
(A)
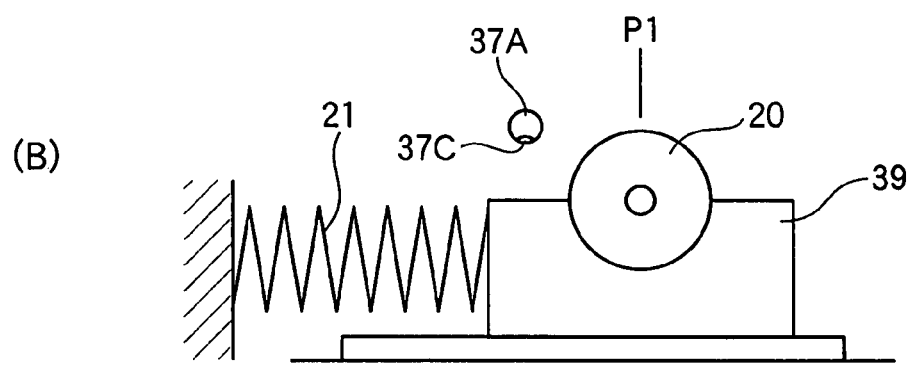
(B)
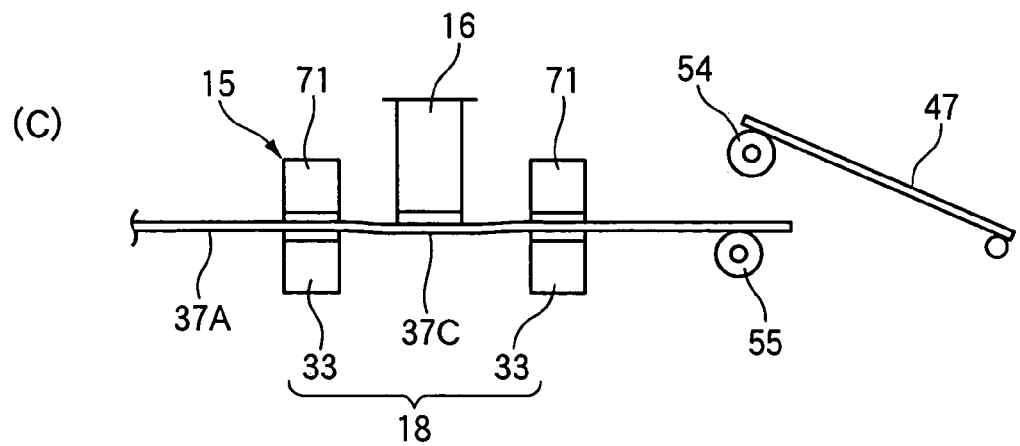
(C)

[FIG. 13]
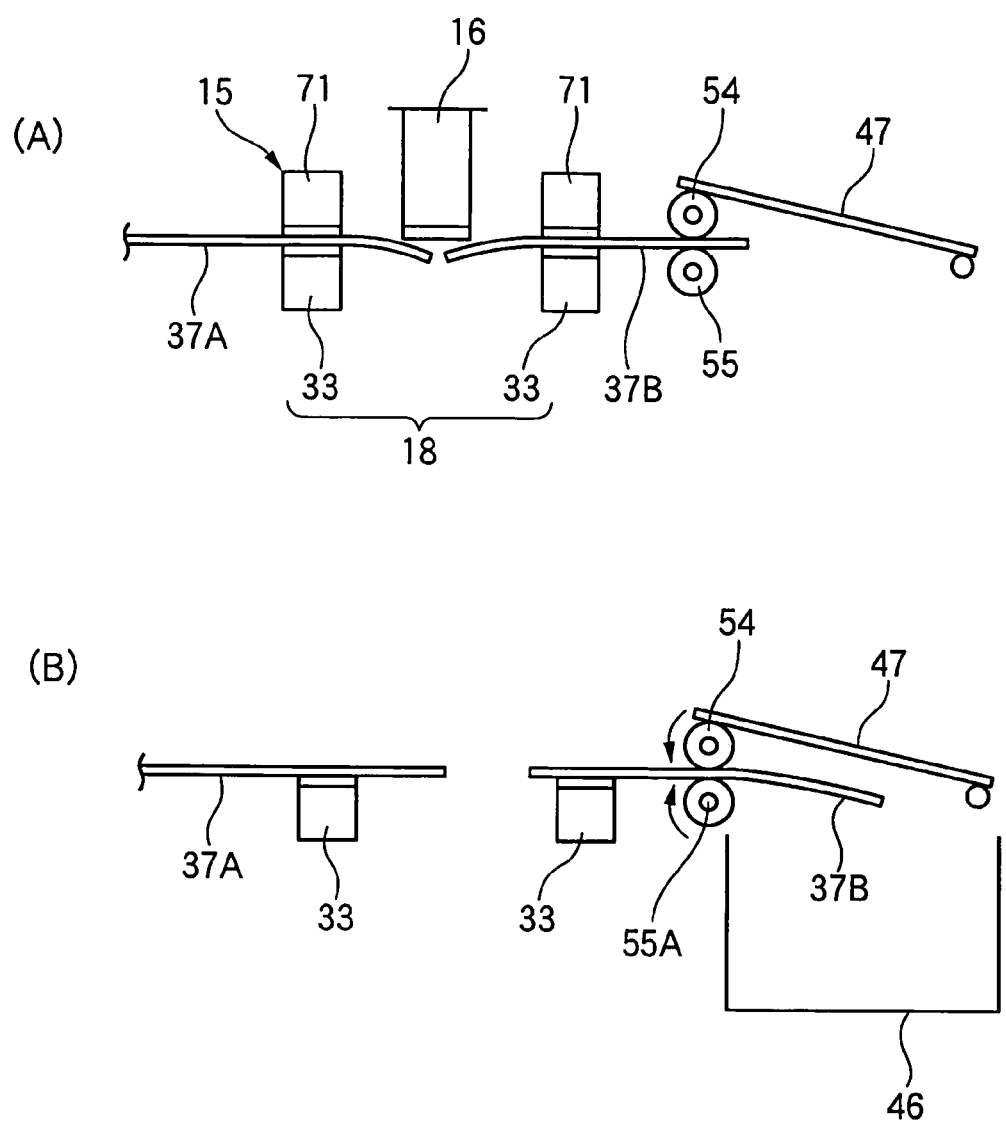

[FIG. 14]
(A)
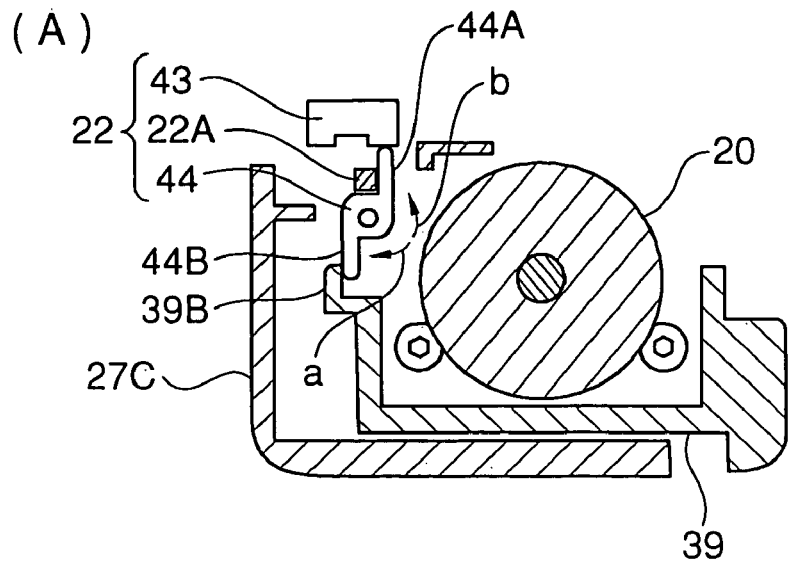
(B)
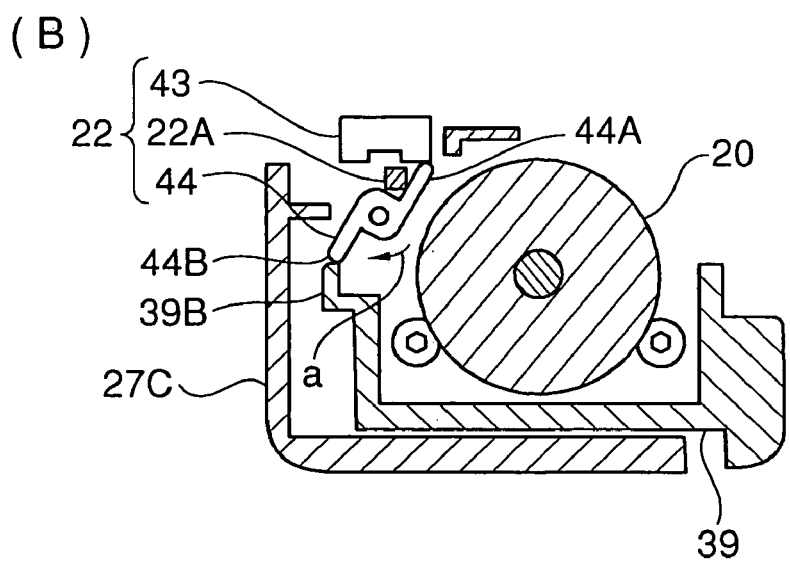
(C)
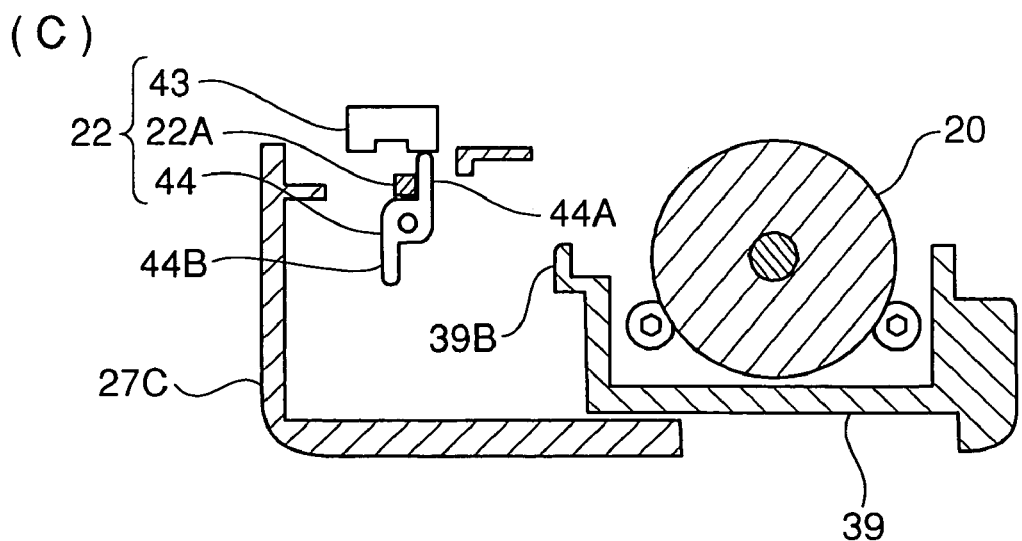

[FIG. 15]
(A) 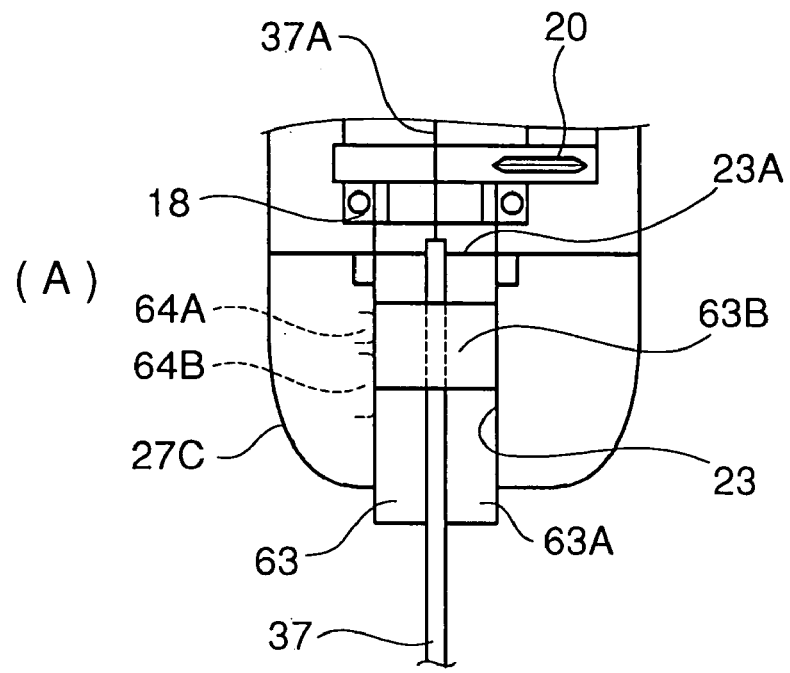
(B) 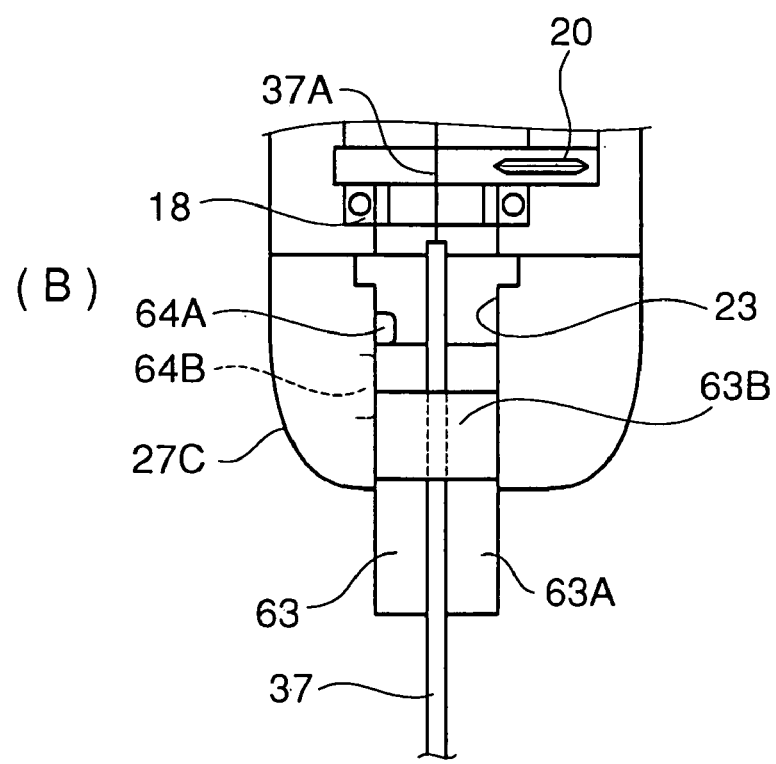

[FIG. 16]
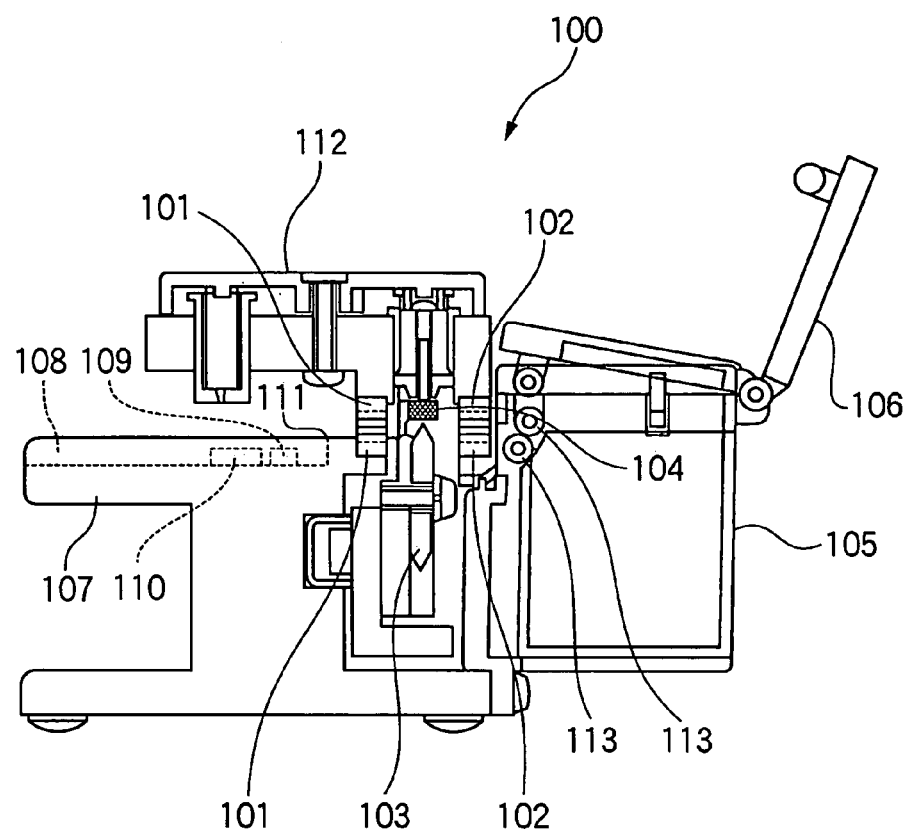

[FIG. 17]
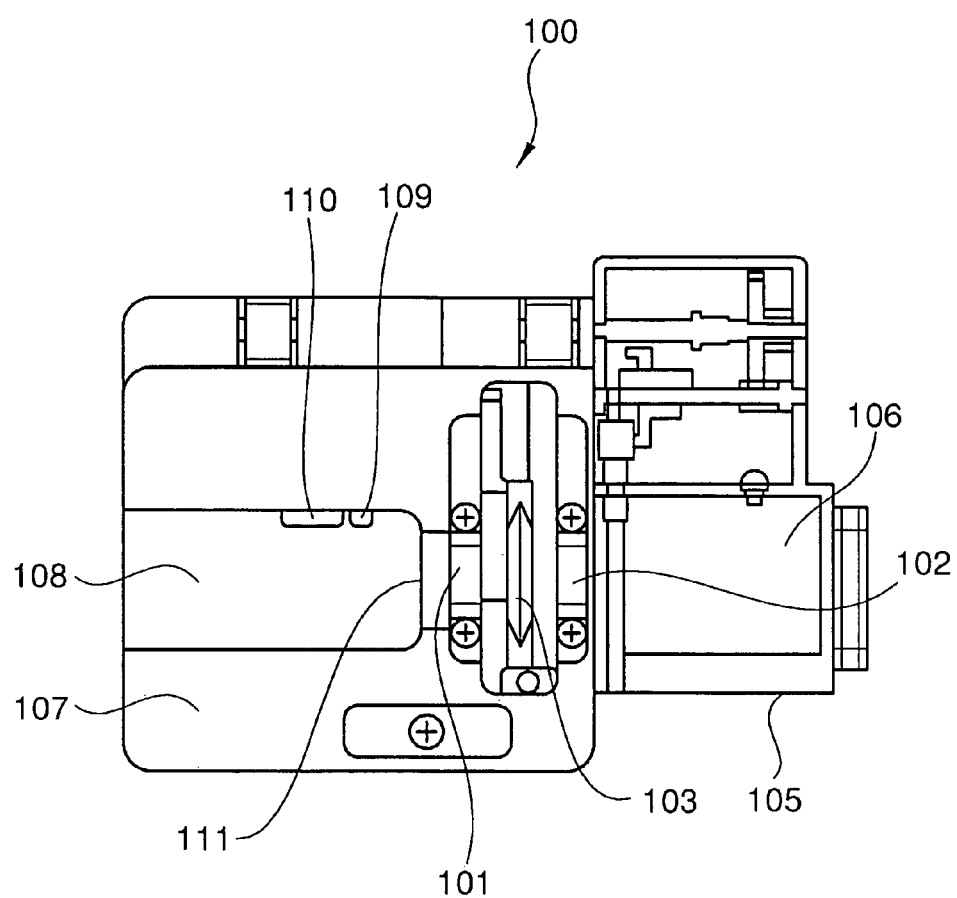

[FIG. 18]
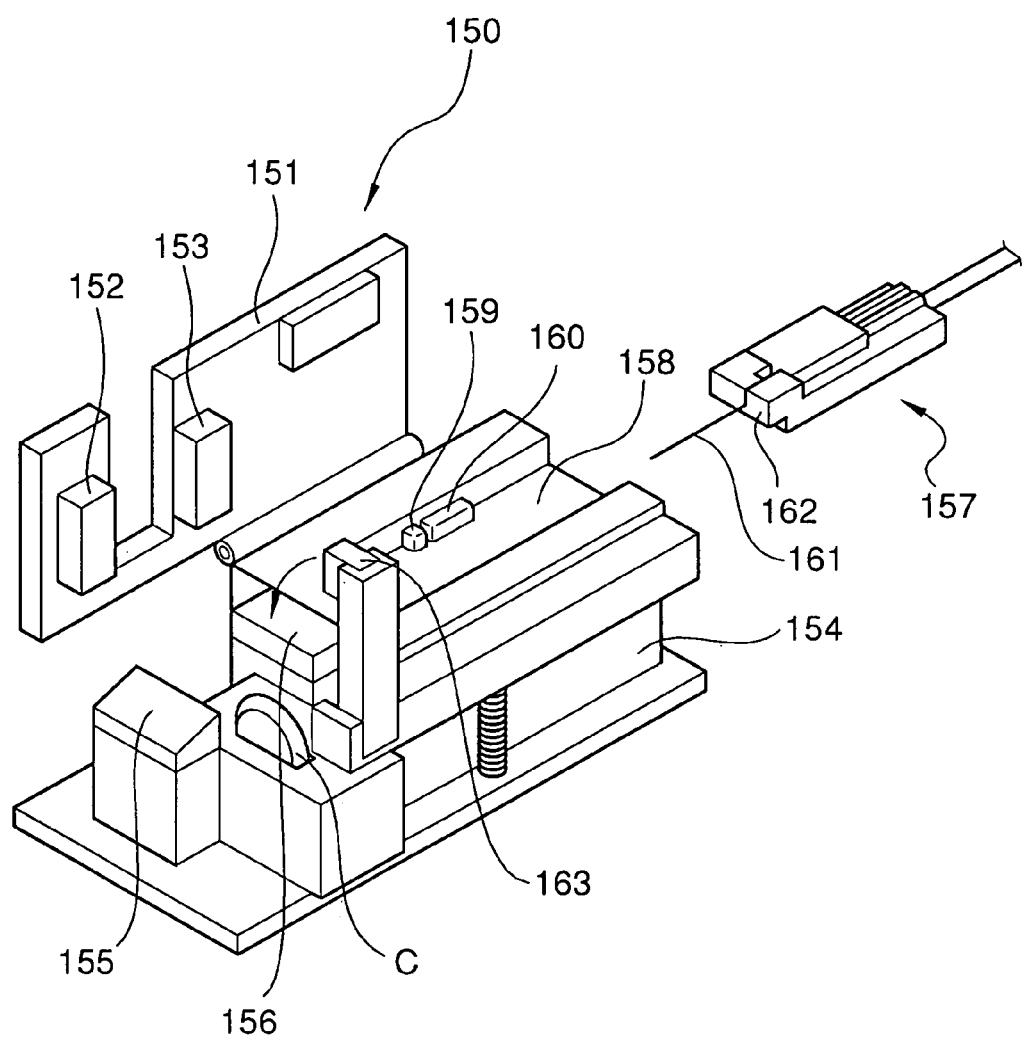

[FIG. 19]
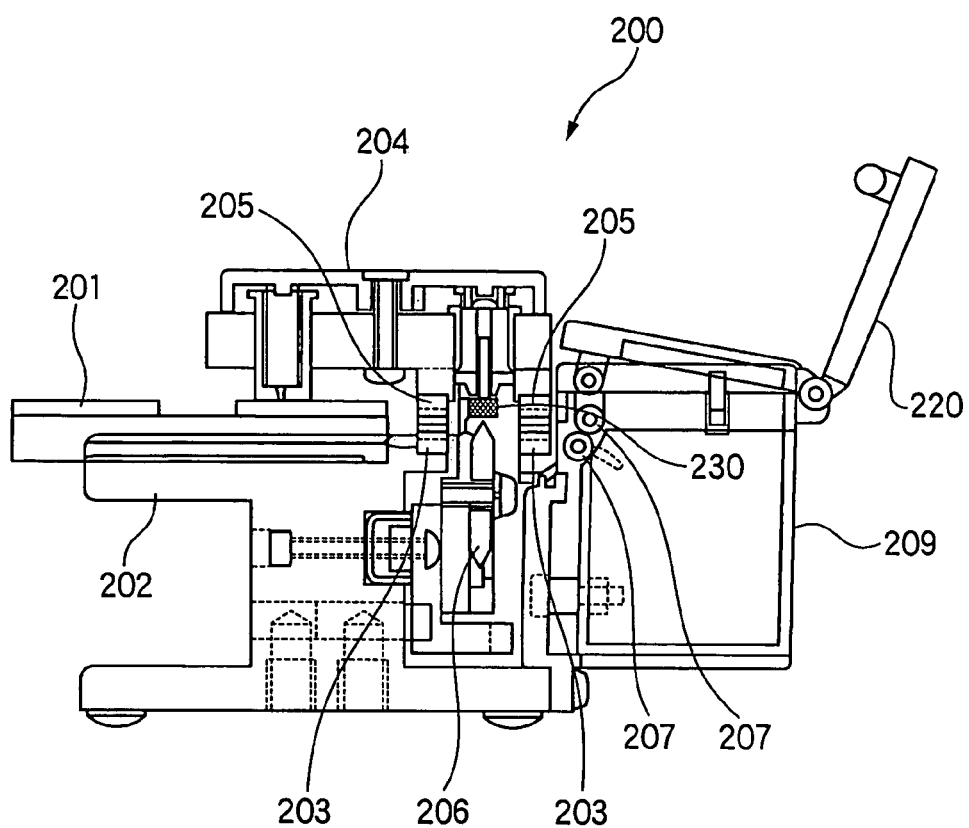

[FIG. 20]
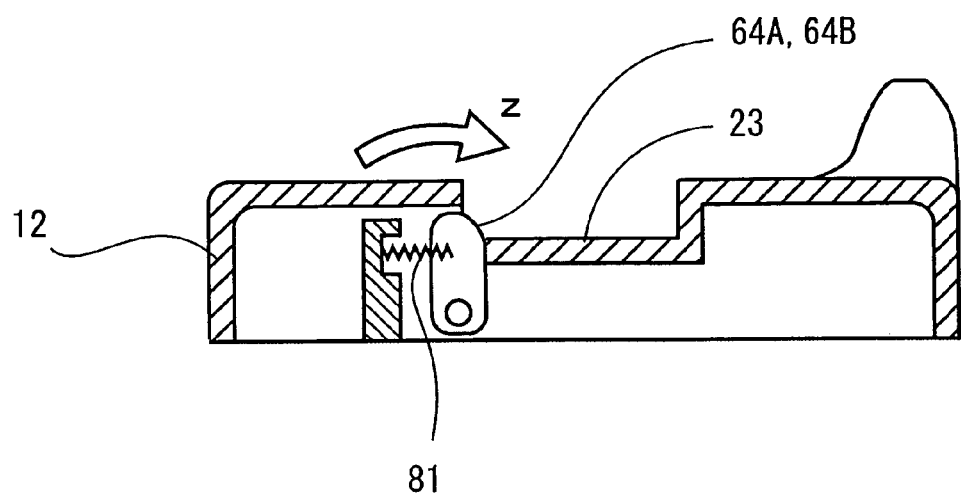

FIBER CLEAVER

TECHNICAL FIELD

The present invention relates to a fiber cleaver which can cleave a glass fiber portion of an optical fiber to a desired length.

BACKGROUND ART

In recent years demands for large-volume and high-speed information transmission have increased and optical fiber communication networks have been provided in office buildings and general homes. In the case of drawing an optical fiber into a home from a trunk line, for example, it is necessary to splice the optical fiber on the side of the trunk line and an optical fiber in the home. Optical fibers are spliced together in the following manner: first, glass fiber portions are exposed by removing the covering of the respective optical fibers; the exposed glass fiber portions are cut; and the cut end faces of the glass fiber portions are butted each other so as to be spliced together.

In the fiber cleavers for cutting a glass fiber portion as disclosed in Japanese Patent Application Publication No. Tokukai 2003-165740 and Japanese Patent Application Publication No. Tokukai-Hei-9-90136, an initial scratch is afforded to the surface of a glass fiber portion and the part including the scratch is pressed so as to cause the initial scratch to develop such that the glass fiber portion is cleaved at the position of the initial scratch.

FIG. 19 is a side view of the fiber cleaver disclosed in Japanese Patent Application Publication No. 2003-165740. For cutting a glass fiber portion using a cleaver 200, first an optical fiber is held by a holder 201 in the state of the glass fiber portion being exposed protruding from the end of the optical fiber, and the holder 201 is mounted on the main body 202. Thus, the glass fiber portion is positioned on a pair of lower holding parts 203. Next, an operator manually closes a cover 204 provided at an upper position of the main body 202 so that the glass fiber portion is fixed by the pair of lower holding parts 203 and a pair of upper holding parts 205 provided in the cover 204.

Subsequently, the operator manually moves the cutter 206, which is provided between the pair of upper holding parts 205 and the pair of lower holding parts 203, in a direction perpendicular to the longitudinal direction of the glass fiber portion so that the movement of the cutter 206 affords an initial scratch to the surface of the glass fiber portion. Subsequently, as a result of a breaker 230 pressing the part including the initial scratch, the scratch is developed so as to break the glass fiber portion at the position of the initial scratch. Closing the cover 220 causes the unnecessary broken piece of the glass fiber portion to be inserted between the upper and lower guide rollers 207. In this state, the operator manually turns the upper and lower guide rollers 207 to convey the unnecessary piece, which has been inserted between the upper and lower guide rollers 207, to a storage part 209.

In the case of cleaving a glass fiber portion with the fiber cleaver 200, the movement of the cutter 206, the opening and shutting of the cover 220, and the turning of the upper and lower guide rollers 207 must be performed manually, which results in the hindrance to shortening the cleaving work. Also, it is difficult to achieve satisfactory reproducibility in cleaving performance because the movement speed of the cutter 206 differs depending on an operator.

In addition, the method disclosed in Japanese Patent Application Publication No. 2003-165740 has the step of holding an optical fiber at the holder 201 before the step of cutting the glass fiber portion. In the holding step, the optical fiber is held by the holder 201 after the length of the optical fiber portion that protrudes from the holder 201 has been adjusted according to the manner in which the glass fiber portion is subsequently processed. The optical fiber held by the holder 201 is processed so that the protective covering of the optical fiber is removed on the tip side thereof with the pre-determined length from the tip of the holder 201 being left as it is, whereby a glass fiber portion without the protective covering is obtained. Thereafter, the glass fiber portion is cut to the predetermined length using the above mentioned cleaver and so on.

Once an optical fiber is held by the holder 201, it is set to the cleaver or splicer without removing the optical fiber from the holder 201, and the processing work in the subsequent cleaving step and the step of splicing with another optical fiber is performed in that state. Therefore, the length of the optical fiber having its protective covering that protrudes from the holder 201 is determined by the setting conditions of these devices. For example, in the case of fusion-splicing of glass fibers, the protruding portion having a protective covering is usually short comparatively, and in the case of mechanical splicing of glass fibers without making fusion-splice, the protruding portion having a protective covering is long.

In the cleaver 200, the position at which the holder is mounted is predetermined, and the holder 201 is fixed at the predetermined position on the main body 202, and the glass portion is cut. In this case, since the pre-determined fixing position does not agree with the cleaving position, in order to increase the length of the portion having the protective covering that protrudes from the holder 201, a spacer and the like is arranged so that the holder 201 is fixed through the spacer such that the distance between the holder 210 and a cutting blade 206 is adjusted accordingly. A distance adjusting member such as the spacer is small, and the setting work in the cleaver tends to take time. Also, it may be necessary to prepare more than one kind of spacers according to the various lengths in which optical fibers protrude from the holder, and the safekeeping of a plurality of spacers is burdensome. Moreover, since the spacers are small, careful attention is needed so that they may not be lost.

Patent literature 1: Japanese Patent Application Publication No. Tokukai 2003-165740

Patent literature 2: Japanese Patent Application Publication-No. Tokukai-Hei 9-90136

DISCLOSURE OF THE INVENTION

Problems to be Solved by the Invention

The object of the present invention is to provide fiber cleavers with which the cleaving of a glass fiber portion can be accomplished with satisfactory reproducibility and in a short time without depending on a particular working environment.

Means to Solve the Problem

In order to achieve the object, a fiber cleaver is provided which comprises a holding member for holding a glass fiber portion of an optical fiber, a cutter for affording a scratch to the glass fiber portion which is held by the holding member, an elastic member or spring for moving the cutter, and a slider engaging member for maintaining the elastic member or spring in a state of elastic deformation.

Also, the fiber cleaver of the present invention may further comprises a containing part for containing unnecessary pieces that have been cut away from glass fiber portions, and in addition may have guide rollers for conveying the unnecessary cut-away pieces into the containing part. In this case, the containing part may have a cover that can open and shut in a manner synchronous with the movement of the cutter. The containing part may additionally have an elastic member or spring for pushing the cover in a closing direction, and may also have a cam that causes the cover to open and shut synchronously with the movement of the cutter. Preferably, the cam has a form which allows the cover to close after a glass fiber has been cleaved. Or, the containing part may have a container which can be removed from the fiber cleaver. The container may have a curved portion for leading unnecessary cut-away pieces backward in the container and may have an adhesive on the inner bottom surface.

The fiber cleaver of the present invention may have an upper casing, a lower casing, and a pivot member pivotably connecting the upper casing and the lower casing. In this case, the holding member may comprise an upper holding member provided in the upper casing and a lower holding member provided in the lower casing and arranged opposite to the upper holding member. The cutter, the elastic member or spring, the slider engaging member, the holder engaging part and the containing part may be arranged in the lower casing. Also, the slider engaging member may be structured such that the elastically deformed condition of the elastic member or spring is released by closing the upper casing and the lower casing.

The fiber cleaver of the present invention may be structured such that the glass fiber portion can be inserted between the upper casing and the lower casing from a position opposite to the pivot member toward the pivot member side. The fiber cleaver may be structured such that the glass fiber portion is disposed in a direction perpendicular to the pivot of the pivot member. The fiber cleaver of the present invention may have an elastic member or spring for pushing the upper casing and the lower casing in an opening direction, and may have a lock to maintain the upper and lower casings in a closed condition. Also, the fiber cleaver of the present invention may have a structure in which at least one of the ends of the upper casing and the lower casing is removable and in which at least one of the upper casing and the lower casing may have a hole through which a strap can be inserted. The upper and lower casings may be made of magnesium or aluminum.

Another embodiment of the present invention is a fiber cleaver that comprises a holding member for holding the glass fiber portion of an optical fiber, a cutter for affording a scratch to the glass fiber portion held by the holding member, and a holder engaging part for holding a holder that holds an optical fiber at its part having a protective covering. The holder engaging part may have a first holder engaging member for pushing and holding the holder in a direction parallel to a movement direction of the cutter.

The holder engaging part may also have a second holder engaging member which can hold the holder by pushing it in a direction parallel to a movement direction of the cutter and which can set the holder position in a direction perpendicular to the movement direction of the cutter. Also, the first holder engaging member and the second holder engaging member may be structured to be pushed from the direction of the pivotal movement thereof. The first holder engaging member and the second holder engaging member may be chamfered, and may be made of resin.

Advantageous Effect of the Invention

The fiber cleaver of the present invention makes it possible to perform cleaving of a glass fiber portion in a short time without depending on a particular work environment and with satisfactory reproducibility.

The Best Mode for Impelmenting the Invention

Embodiments of the present invention will be described hereinafter in reference to the drawings. The drawings are provided for the purpose of explanation only, and are not intended to limit the scope of the invention. The same marks indicate the same parts to avoid repeated explanation in the drawings. The ratios of dimensions in the drawings are not always accurate.

FIG. 1 is a perspective view of a fiber cleaver according to a first embodiment of the present invention and a holder to be mounted thereto. FIGS. 2, 3, and 4 are respectively a right side view, left side view, and rear view of the fiber cleaver according to the first embodiment of the present invention. FIG. 5 is a sectional view of the fiber cleaver according to the first embodiment of the present invention and shows a state in which the upper and lower casings are opened. FIG. 6 is a figure similar to FIG. 5 and shows a state in which the upper and lower casings are closed. FIGS. 7, 8, and 9 are sectional views taken along lines VII-VII, VIII-VIII, and IV-IV, respectively. Symbols in which a mark × is put in a circle in the figures indicate a perpendicular direction from the surface to the reverse side of the pages including the figures, and symbols in which a large dot is put in a circle in the figures indicate a perpendicular direction from the reverse side to the surface of the pages including the figures.

A fiber cleaver 10 has an upper casing 11 and a lower casing 12 each having a substantially rectangular body, and a pivot member 13 which pivotably connects the upper casing 11 and the lower casing 12 together. The upper casing 11 is equipped with an arm 14 on which an upper holding member 15 and a breaker 16 are arranged. The lower casing 12 is provided with a lower holding member 18, which is arranged at a position opposite to the upper holding member 15, and is also provided with a cutter 20, an elastic member or spring 21, a slider engaging member 22, a holder engaging part 23, and a containing part 24. The upper holding member 15 and the lower holding member 18 constitute a holding member for holding a glass fiber portion.

The structure of the upper and lower casings 11 and 12 makes it possible to efficiently provide necessary cleaving parts in the upper and lower casings, arranging the upper holding member 15, the breaker 16, the lower holding member 18, the cutter 20, the elastic member or spring 21, the slider engaging member 22, the holder engaging part 23, the containing part 24, for example. Thus, the cleaver 10 can be downsized and the external appearance thereof can be improved. Moreover, the pivotable connection of the upper casing 11 and the lower casing 12 allows the cleaver 10 to have a shape suitable for easy grip, thereby allowing its operator to perform cleaving work by grasping the cleaver by one hand. Since it is possible to hold the cleaver 10 by hand, it is possible to perform cleaving of the glass fiber portion easily at a high working location. Providing the holding members in the upper casing 11 and the lower casing 12 respectively allows the glass fiber portion to be inserted surely so as to be fixed.

First, a description about the parts to be provided in the lower casing 12 will be given below. As for the lower casing 12, the other end portion 29 of the lower casing main body 27 is pivotably connected through the pivot member 13 to the other end portion 32 of the upper casing 11. The lower holding member 18 is fixed on the upper part 27A of one end portion 28 of the lower casing main body 27. The lower holding member 18 consists of one pair of lower holding parts 33 arranged with a space therebetween. The lower holding parts 33 each comprise a rubber part 33A provided in the upper surface of a stand made of metal and is structured such that a glass fiber portion 37A of an optical fiber 37 can be put on the rubber part 33A. The one pair of lower holding parts 33 are arranged so as to face one pair of upper holding parts 71 such that the glass fiber portion 37A of the optical fiber 37 can be inserted and fixed by closing the upper casing 11 as described later.

An exposure hole 25 is formed at about middle position between the one pair of lower holding parts 33, and the cutter 20 protrudes upward from the exposure hole 25. The cutter 20 is a disc having an edge around it and is movably disposed in a direction parallel to the pivot 35 of the pivot member 13A. More specifically, as shown in FIG. 5, a support axis 38 is provided at the center of the cutter 20, and the support axis 38 is attached to the slider 39. The slider 39 is arranged inside the lower casing main body 27 and is provided so as to be-movable along a guide 41 in a direction parallel to the pivot 35. Thus, by moving the cutter 20 in a direction parallel to the pivot 35 of the pivot member 13, the cutter 20 can be moved smoothly keeping a balance on either side so as to afford a constant scratch to the glass fiber portion 37A.

An elastic member or spring (compression spring) 21 is provided at the pivot 35 side end of the slider 39 in parallel with the pivot 35. The slider 39 is maintained at the side of the right side face 27B of the lower casing main body 27, that is, at a position (retracting position) as shown in FIGS. 7 and 8, by the elastic member or spring 21. The elastic member or spring 21 is elastically deformed in a direction in which it is compressed by the movement of the slider 39 when the slider 39 is moved in the direction indicated by an arrow $X_1$ by pushing the press button 39A of the slider 39. As a result of the elastic member or spring 21 being elastically deformed, the slider 39 is pushed in a direction parallel to the pivot 35 of the pivot member 13 from the right side face 27B side to the left side face 27C side (fastening position) of the lower casing main body 27 shown in FIG. 1.

When the slider 39 is pushed into the fastening position, it is fastened by the slider engaging member 22 which is provided inside the lower casing main body 27. As a result, the slider 39 and the cutter 20 are maintained at the fastening position in a state in which the elastic member or spring 21 is compressed. The slider engaging member 22 is provided in a manner such that it can protrude from or depressed down into the upper part 27A of the lower casing main body 27 as shown in FIG. 1. The slider engaging member 22 can be pushed in by closing the upper casing 11 and the lower casing 12 and can thereby cancel the condition in which the elastic member or spring 21 has been elastically deformed.

An example of the mechanism in which the slider 39 is fastened or released by the slider engaging member 22 will be described in reference to FIG. 14. FIGS. 14(A) to 14(C) are schematic diagrams illustrating the operation of the slider: FIG. 14(A) is a fastened condition, FIG. 14(B) a released condition, and Fig 14(C) a state in which the slider has moved to a retracted position. The slider engaging member 22 is composed of a release button 43, a fastening part 44 and a stopper 22A. The fastening part 44 is pushed by a spring or the like, which is not illustrated in the figure, in a direction indicated by an arrow b, and the upper portion 44A of the fastening part 44 is fastened by the stopper 22A. The slider engaging member 22 is structured such that the release button 43 abuts the upper end of the fastening part 44 and that by pushing down the release button 43 in a downward direction, the fastening part 44 can be turned in a direction indicated by an arrow a.

A fastening nail 39B is formed at the upper end of the left side face 27C side of the slider 39. When the slider 39 is pushed into the fastening position, the fastening nail 39B of the slider 39 is fastened by the lower portion 44B of the fastening part 44 where the upper portion 44A is fastened by the stopper 22A. Thus, the slider 39 is maintained at a fastening position (FIG. 14(A)). In this condition, when the release button 43 is pushed down, the fastening part 44 turns in a direction indicated by an arrow a against the pressing force of a spring or the like, and the lower portion 44B turns so as to release the fastening nail 39B (FIG. 14(B)). When the lower portion 44B has released the fastening nail 39B, the cutter 20 moves from the fastening position to the retracting position together with the slider 39 (FIG. 14(C)) by means of the resilient force of the elastic member or spring 21 (FIG. 5).

Thus, it is possible to move the cutter 20 by using the resilient force of the elastic member or spring 21, without need of moving the cutter 20 manually. Regardless of the type of an operator of the cleaver 10, the cutter 20 can be moved in a constant movement speed, and the glass fiber portion 37A can be cleaved in a constant condition, thereby obtaining a constant cleaved surface. Thus, by simplifying the cleaving work, it is possible to shorten the time needed for the cleaving work and to easily accomplish the work of cleaving a glass fiber portion even when it is done at a high location. Also, since the slider engaging member 22 can be released by closing the upper casing 11 and the lower casing 12, the releasing work of the slider engaging member 22 is easy and an operator can operate the cleaver 10 with its one hand. In addition, the glass fiber portion 37A can be cleaved by a left-handed operator, in the same manner as in the case of a right-handed operator.

As shown in FIGS. 1 and 5, the cleaver 10 has a containing part 24, which is provided adjacent to the lower holding part 33 at the other end portion 29 side of the lower casing main body 27, for accommodating an unnecessary piece that has been cut away from the glass fiber portion 37A. The containing part 24 has a container 46 which can be removed from the cleaver 10 and a cover 47 which is provided at the opening over the container 46 and which can open and close synchronously with the movement of the cutter 20. Unnecessary pieces that have been cut away from the glass fiber portions 37A can be put in the containing part 24, thereby preventing the unnecessary pieces from being scattered around, and the unnecessary pieces that have thus been gathered can be discarded collectively.

The cover 47 has a structure to turn about an axis 48 for the cover and to open up to the position which is shown by a dot and dash chain line as shown in FIGS. 5 and 6. The containing part 24 has an elastic member or spring (spring member for the cover) 49 (FIG. 6) which pushes the cover 47 in a closing direction, and a cam 51 (FIG. 8) which opens and closes the cover 47 synchronously with the movement of the cutter 20.

The cam 51 is formed integrally with the slider 39 and is arranged between the cutter 20 and the elastic member or spring 21. The bottom end of a pin 52 abuts the upper part of the cam 51 and the upper end portion of pin 52 is connected to the cover 47. The upper part of the cam 51 is formed of a bottom portion 5 1A, an inclined portion 51B, and a top portion 51C such that the cover closes after a glass fiber has been cleaved. That is, when the slider 39 and the cutter 20 are maintained at the retracting position by the elastic member or spring 21, the bottom end of the pin 52 is located on the bottom portion 51A and the cover 47 is closed by the pressing force of a spring member 49 (FIG. 6) for the cover.

On the other hand, when a push button 39A of the slider 39 is pushed to move the slider 39 in a direction indicated by an arrow $X_1$ from the retracting position to the fastening position, the cam 51 moves together with the slider 39. When the cam 51 moves to the fastening position of the slider 39, the bottom end of the pin 52 is pushed up gradually by the inclined portion 51B so as to open the cover 47 gradually against the pressing force of the spring member 49 for the cover. Subsequently, when the bottom end of the pin 52 is on the top portion 51C of the cam 51, the cover 47 is thereby completely opened.

Thus, the mechanism in which the cover 47 can be opened in synchronization with the movement of the cutter 20 in the direction indicated by the arrow $X_1$ allows the cover 47 to open only when the glass fiber portion 37A is cleaved. Since the cover 47 can be closed beforehand for carrying the cleaver, for example, the unnecessary pieces which are accommodated in the containing part 24 are unlikely to spill therefrom even if the cleaver 10 is put sideways or the direction of the cleaver 10 is changed.

As shown in FIG. 6, the containing part 24 has guide rollers for conveying an unnecessary piece of the glass fiber portion 37A into the containing part (container) 24. An upper guide roller 54 is installed at the opening end side of the cover 47 so as to be freely rotatable and a lower guide roller 55 is installed in the lower casing main body 27 so as to be freely turnable. Under the condition in which the cover 47 is closed, the upper guide roller 54 abuts on the lower guide roller 55.

The support axis 55A of the lower guide roller 54 is provided with a gear which is not illustrated in the figure, and this gear is engaged, through a plurality of idle gears (which are not illustrated in the figure), with a gear 57 that is provided about the pivot 35 of the pivot member 13 (FIG. 9). When the upper and lower casings 11 and 12 are opened, the gear 57 turns integrally with the pivot 35 and transfers the turn of the gear 57 to the gear of the support axis 55A through the idle gear group. According to the turn of the support axis 55A, the lower guide roller 55 turns. The turn of the lower guide roller 55 is transferred to the upper guide roller 54, thereby causing the upper guide roller 54 to turn. The turning of the upper and lower guide rollers conveys an unnecessary piece of glass fiber portion 37A that has been inserted between the upper and lower guide rollers into the container 46, and the unnecessary piece is surely led into the containing part 24.

The container 46 is structured such that it can be removed in a direction indicated by the arrow $X_1$ from the lower casing main body 27 of the fiber cleaver 10 as shown in FIG. 1. As shown in FIG. 8, an opening 78 is formed in the left side face 27C of the lower casing main body 27, and the container 46 is put in the lower casing main body 27 from the opening 78. Thus, since the container 46 is removable, the unnecessary pieces can be discarded by removing the container 46 without turning the whole cleaver 10. A concavity 79 is provided at a lower position in the opening 78 in the left side face 27C (FIG. 3, FIG. 8). The container 46 can therefore be drawn out by putting a finger into the concavity 79 and hanging the finger at a bottom end portion 46D of the container 46.

As shown in FIG. 1, the container 46 has a curved portion 59 which leads the unnecessary pieces of glass fiber portions 37A that have been cut away to the innermost side of the container 46. The curved portion 59 is arranged on the pivot 35 side (FIG. 5) and on the opposite side relative to the direction in which the container 46 is removed. As a result of the formation of the curved portion 59 in the container 46, unnecessary pieces which have been conveyed in the direction indicated by an arrow C can be led in a direction indicated by an arrow D toward the innermost side 46A of the container 46. Thus, the entrance of the container 46 can be prevented from being clogged with the unnecessary pieces.

The approximately half part of the container 46 from its removing side end is covered with an openable and closable cover 46B. Thus, with the cover 46B, the container 46 can also prevent the fall of the unnecessary pieces of glass fiber portion 37A when the container 46 is removed from the cleaver. Moreover, the container 46 has an adhesive on the inner bottom surface 46C. The adhesive may for example be a both-side adhesive tape. With the adhesive provided on the inner bottom surface 46C, it is possible to prevent the unnecessary pieces from falling from the container 46 and from being scattered, and the unnecessary pieces can be stored securely.

As shown in FIG. 1, on the surface of the one end portion 28 of the lower casing main body 27, there is provided a holder engaging part 23 for fixing a holder which holds an optical fiber 37 by the protective covering portion. The holder engaging part 23 is a depressed part formed so as to hold a holder 63. The holder 63 has, for example, a structure in which a holder member 63B is detachably attached on a support plate 63A and in which a groove 63C for positioning the optical fiber 37 is provided in the upper part of the support plate 63A.

With the structure in which the holder 63 can be held in the holder engaging part 23, it is possible to hold an optical fiber before fixing the glass fiber portion 37A by the upper and lower holding members 15 and 18. A graduation 26 is provided adjacent to the holder engaging part 23. With the graduation 26 the glass fiber portion 37 can be cleaved to a desired correct length (protruding-out length).

As shown in FIG. 1, the holder engaging part 23 has a first holder engaging member 64B for pushing and fixing a side of the holder 63 in a parallel direction (a direction indicated by an arrow $X_1$-$X_2$) with respect to the movement direction of the cutter 20. In addition, the holder engaging part 23 has a second holder engaging member 64A with which the holder can be fixed by pushing the holder in a parallel direction relative to the movement direction of the cutter 20 and with which the holder can be set at a desired position in a direction perpendicular to the direction of the cutter 20 movement. The first holder engaging member 64B and the second holder engaging member 64A are pushed by an elastic member (spring) 81 in the pivoting direction in a direction indicated by an arrow Z, for example (FIG. 20).

FIGS. 15(A) and 15(B) illustrate a state in which the holder is held in the holder engaging part of a fiber cleaver according to the first embodiment of the present invention. When the optical fiber 37 is to be set such that its protrusion from the tip of the holder 63 becomes shorter, as shown in FIG. 15(A), the holder 63 is slid toward the direction of the cutter 20 in a state where the holder 63 is set in the holder engaging part 23 after the two protruding holder engaging members 64A and 64B have been pushed inside the holder engaging part 23. In the course of such sliding movement, the tip of the holder 63 contacts a position regulating part 23A, and thereby the holder 23 is positioned and is fixed in the holder engaging part 23 by the holder engaging members 64A and 64B.

When the optical fiber is to be set in a manner in which the protrusion thereof from the tip of the holder 63 becomes longer, the holder 63 is set in the holder engaging part 23 as shown in FIG. 15(B), by pushing only the first holder engaging member 64B. Thereafter, when the holder 63 is slid toward the cutter 20, the slide is regulated by the second holder engaging member 64A, and the holder 63 is positioned in the position thus determined and is fixed in the holder engaging part 23 by the first holder engaging member 64B.

In the case of the first embodiment, the first holder engaging member 64B is a member which is longer than the second holder engaging member 64A. This is to maintain the holder 63 firm in the holder engaging part 23 by holding the side of the holder 63 fast even in the case of the holder 63 having a concavity in the side. The number of the holder engaging members to be provided may be three or more.

Preferably, the first holder engaging member 64B and the second holder engaging member 64A are chamfered and rounded at its corner so that the holder 63 can easily be put into the holder engaging part 23. The term "corner" means a part where two side faces meet or a part where a side face and a plane surface meet. Also, the first holder engaging member 64B and the second holder engaging member 64A are preferably made from a resin. Thus, it is possible to prevent the holder 63 from being scratched with the holder engaging members, since in many cases the holder 63 is made of a metal.

By pushing the side of the holder 63 with such holder engaging members 64A and 64B, the glass fiber portion 37A can be more securely fixed through the holder 63 when the cutter 20 is moved to cleave the glass fiber portion 37A. The kind of the holder 63 may be varied in accordance with the kind of the optical fiber 37.

As shown in FIGS. 1 and 5, at least one of the ends of the upper casing 11 and the lower casing 12 is structured to be removable: in the case of this embodiment, the one end portion 28 of the lower casing 12 on the side opposite to the pivot member 13 side. The one end portion 28 can be divided into two parts: the upper end part 61 in which the holder engaging part 23 is provided and the bottom end part 62. Thus, it is possible to remove the upper end part 61 of the one end portion 28 partially and to exchange the holder engaging part 23 according to the shape of the holder 63. On the other hand, by removing the bottom end part 62 of the one end portion 28 partially without disassembling the cleaver 10, it is possible to easily perform the adjustment and exchange of the cutter 20 as well as the adjustment and exchange of the lower holding member 18. In addition, it is possible to exchange the holder engaging member according to the shape of the holder by removing one end of the casing partially.

Moreover, as shown in FIG. 4, at least one of the upper casing 11 and the lower casing 12, here in this embodiment the other end portion 29 of the lower casing 12, has a strap hole 67 through which a strap 66 can be inserted. The strap hole 67 is a through-hole through which an opening 67A and an opening 67B are connected. By attaching the strap 66 through the strap hole 67 beforehand, the cleaver 10 can be hung on the neck of an operator or a hook, or the like with the strap 66, and it is convenient for working at a high location in particular.

The following is an explanation about parts which constitute the upper casing 11. The other end portion 32 of the upper casing 11 is connected with the lower casing 12 through the pivot 35 of the pivot member 13. In the upper casing 11, the arm 14 is arranged extending from the pivot 35 toward the one end portion 31 of the upper casing 11. As shown in FIG. 9, the other end 14A of the arm 14 is fixed to the pivot 35 with screws 14C, for example, in a freely swayable manner using the pivot 35 as an axis. The height of the upper holding member 15, the breaker 16, and the like, which are provided in one end 14B of the arm 14, can minutely be adjusted by loosening the screws 14C and changing the angle of the arm 14.

At the one end 14B of the arm 14, the upper holding member 15 is provided in a manner in which it can freely slide upward and downward in a direction parallel to the pivot 35. The upper holding member 15 is composed of one pair of upper holding parts 71. Also, one pair of compression springs 72 (FIGS. 6 and 7) are provided between the one end 14B of the arm 14 and the rear surface of the upper casing 11.

As shown in FIG. 5, the upper holding member 15 has two upper holding parts 71 for holding the glass fiber portion 37A by two points and the lower holding member 18 also has two lower holding parts 33 for holding the glass fiber portion 37A by two points. Thus, the glass fiber portion 37A can be fixed at two points, and thereby the glass fiber portion 37A can be prevented from shifting its position while the cutter 20 passes therebetween for affording a scratch thereon, or the glass fiber portion 37A can be fixed more securely. Therefore, the glass fiber portion 37A can be surely broken from the part on which the scratch has been put and the constant cleaved surface can securely be obtained.

FIGS. 10(A)-10(C) are sectional views of a holding member for holding a glass fiber portion: FIG. 10(A) shows an opened condition; FIG. 10(B) a closed condition; and FIG. 10(C) a condition where glass fiber portions are gripped. As shown in FIG. 10(A), the upper holding part 71 has a rubber part 71A provided on the surface of its stand made of metal. The protuberances 71B which protrude below the surface level of the rubber part 71A are provided at both edges of the rubber part 71A. Such structure allows the protuberances 71B of the upper holding part 71 to abut both ends 33B of the lower holding part 33 as shown in FIG. 10(B) and thereby makes it possible to prevent the rubber part 71A of the upper holding part 71 and the rubber part 33A of the lower holding part 33 from abutting each other when the upper and lower casings 11 and 12 are closed while the cleaver 10 is not used. Therefore, the upper and lower rubber parts 71A and 33A are unlikely to be deteriorated by sticking each other closes while the upper and lower casings 11 and 12 are closed for a long time.

When the upper and lower casings 11 and 12 are closed, as shown in FIG. 10(C), the interval S between the rubber part 71A of the upper holding part 71 and the rubber part 33A of the lower holding part 33 is adjusted to be less than the diameter D of the glass fiber portion 37A. Therefore, it is possible to securely hold the glass fiber portion 37A by inserting it between the rubber part 71A of the upper holding part 71 and the rubber part 33A of the lower holding part 33.

In this case, the direction of the span W (see FIG. 10(C)) is arranged in parallel with the pivot 35 as shown in FIG. 5, and the upper and lower holding members 15 and 18 can equally be afforded with fixing force F over the whole span W of the upper and lower holding parts 71 and 33. Accordingly, when a plurality of glass fiber portions 37A are arranged in line widthwise between the upper and lower holding parts 71 and 33 as shown in FIG. 10(C), it is possible to apply fixing force equally on all of the glass fiber portions 37A.

As shown in FIG. 5, the breaker 16 for breaking the glass fiber portion by developing a scratch put thereon is provided at the center between the upper holding parts 71. The breaker 16 is fixed to the one end 14B of the arm 14 in a manner in which the breaker 16 is recessed from the top surface of the upper holding part 71. When the upper and lower casings 11 and 12 are closed, the breaker 16 can press the part including the scratch of the glass fiber portion 37A so as to develop the scratch to break. The breaker 16 comprises a stand made of metal and a rubber part that is put on the surface thereof, for example. The scratch put with the cutter 20 can be developed by making the breaker 16 to press the part including the scratch so as to surely break the glass fiber portion 37A at the part which is scratched with the cutter 20, and thereby a good cleaved surface can be obtained.

As shown in FIGS. 5 and 6, the upper casing 11 and the lower casing 12 are pushed by an elastic member (casing spring) 73 in a direction in which they open. The angle (opening angle) θ formed by the upper casing 11 and the lower casing 12 when they are open is set to about 30 degrees, for example. Thus, the upper and lower casings 11 and 12 can easily be opened, for example, with one hand using the pressing force of the casing spring 73 after cleaving work has ended. Since the upper and lower casings 11 and 12 can be maintained in an opened condition by the pressing force of the casing spring 73, the holder can easily be mounted on the holder engaging member when cleaving work is to be done. Also, after the cleaving of the glass fiber portion 37A is completed, the holder 63 in which the optical fiber 37 is held can easily be removed from the cleaver 10.

When the cleaning and replacement of parts are taken into consideration, for example, it is preferable that about 90 degrees of the opening angle formed by the upper casing 11 and the lower casing 12 be securely obtainable. The cleaver 10 is structured such that 90 degrees or more opening angle is securely obtained pivotably between the upper and lower casings 11 and 12 by removing the knob 13A (FIG. 9) of the pivot member 13 from the pivot 35 to cancel the regulation of limiting the opening angle to 30 degrees. By making the upper casing 11 and the lower casing 12 to be pivotable about equal to or more than 90 degrees, the cleaning work of the cleaver 10 can easily be performed. Moreover, by opening the upper and lower casings 11 and 12 at an opening angle equal to or more than 90 degrees, the adjusting and replacement of the parts provided at vicinity of the pivot member can easily be done.

As shown in FIGS. 1 and 2, the cleaver 10 has, on a side 11A of the upper casing 11, a lock 76 for maintaining the upper casing 11 and lower casing 12 in the closed condition. The lock 76 has a lock button 76A that can be slid along the side 11A of the upper casing 11 and a lock pin 76B (see FIG. 2) connected to the lock button 76A.

As shown in FIG. 2, by sliding the lock button 76A in a direction indicated by an arrow $Y_1$ toward one end portion 31 side of the upper casing 11, the tip portion of the lock pin 76B is caused to protrude from the one end portion 31 of the upper casing 11. The tip portion of the protruding lock pin 76B is inserted in a lock hole 78 formed in the protuberant portion 77 of the lower casing 12. Thus, it is possible to maintain the upper and lower casings 11 and 12 in the closed condition with the lock 76. Since the cleaver 10 can be kept in a closed condition when it is not used, it is possible to make dust and the like not to easily enter the opening of the cleaver 10.

On the other hand, for opening the upper and lower casings 11 and 12, the lock button 76A is slid in a direction indicated by an arrow $Y_2$ toward the other end portion 32 side of the upper casing 11 so that the tip portion of the lock pin 76B is pulled out from the lock hole 78. As a result, the upper and lower casings 11 and 12 are released by the pressing force of the casing spring 73 (FIGS. 5 and 6).

The upper casing 11 and the lower casing 12 are made of magnesium or aluminum. Since magnesium and aluminum are light-weight material, the cleaver 10 can be made light-weight by forming the upper casing 11 and the lower casing 12 from magnesium and aluminum. Thus, an operator can carry the cleaver 10 by putting it in the pocket or the like. Moreover, by shaping the upper and lower casings 11 and 12 to have round corners as shown in FIG. 1, the cleaver 10 is made easy to put in a pocket or like of the operator, and not only it is made easy to grip but also a feel of fitting is enhanced when it is grasped.

An example in which a glass fiber portion 37A is cleaved with a fiber cleaver 10 will be described in reference to FIG. 11 to FIG. 13. FIGS. 11(A) to 11(C) are schematic diagrams which illustrate a first function of the fiber cleaver of the present invention. FIGS. 12(A) to 12(C) are schematic diagrams which illustrate a second function of the fiber cleaver of the present invention. FIGS. 13(A) and 13(B) are schematic diagrams which illustrate a third function of the fiber cleaver of the present invention. In FIG. 11(A), by pushing the press button 39A of the slider 39 in a direction indicated by an arrow, the cutter 20 moves from a retracting position P1 in a direction indicated by an arrow $X_1$ against the pressing force of an elastic member or spring 21. In FIG. 11(B), the cutter 20 is pushed to a fastening position P2 and the elastic member or spring 21 is compressed. In this condition, a fastening part 44 which is shown in FIG. 14(A) fastens a fastening nail 39B of the slider 39. Thus, the cutter 20 is held at the fastening position P2.

In FIG. 11(C), the holder 63 on which the glass fiber portion 37A is fixed is mounted to the holder engaging part 23. In this case, the glass fiber portion 37A is inserted between the upper casing 11 and the lower casing 12 toward the pivot member 13 from the side opposite to the position of the pivot member 13. In other words, the glass fiber portion 37A is arranged in a direction perpendicular to the pivot 35 of the pivot member 13.

Since the glass fiber portion 37A is inserted toward the pivot member 13 from the side in which the upper and lower casings 11 and 12 are opened, an operator 90 can perform cleaving work at the front side, that is, on the side where the upper and lower casings 11 and 12 are opened. Thus, since the operator can easily see the cleaving condition of the glass fiber portion 37A, the load on the operator 90 can be reduced accordingly. Also, even by a left-handed operator, the cleaving work can easily be done and the glass fiber portion can be cleaved in a constant condition.

After the holder 63 on which the glass fiber portion 37A is fixed is attached to the holder engaging part 23, the upper casing 11 is turned in a direction indicated by an arrow in FIG. 11(C) (the direction in which the upper and lower casings 11 and 12 are to be closed simultaneously) using the pivot 35 of the pivot member 13 as an axis (see FIG. 5). Thus, closing the upper and lower casings 11 and 12 causes the upper casing 11 to push the slider engaging member 22 into the lower casing 12. When the release button 43 (FIG. 14(B)) of the slider engaging member 22 (FIG. 14(B)) enters into the lower casing 12, the fastening part 44 turns in a direction in which the fastening of the fastening nail 39B is released against the pressing force of a spring (not illustrated).

As shown in FIG. 12(A), because of the resilient force of the elastic member or spring 21 the cutter 20 moves with the slider 39 from the fastening position P2 in a direction indicated by an arrow $X_2$. Thereafter, the cutter 20 reaches the retracting position PI together with the slider 39 as shown in FIG. 12(B). In this case, the cutter 20 affords a scratch 37C to the underside of the glass fiber portion 37A on the way in which the cutter 20 is caused to move from the fastening position P2 to the retracting position P1 by means of the resilient force of the elastic member or spring 21. Moreover, in FIG. 12(C), the breaker 16 descends to press the part including the scratch 37C of the glass fiber portion 37A.

In FIG. 13(A), the descent of the breaker 16 presses the part including the scratch 37C of the glass fiber portion 37A and thereby develops the scratch 37C so as to break the glass fiber portion 37A from the position of the scratch 37C. In this condition, the cover 47 is fully closed and the unnecessary piece 37B broken away from the glass fiber portion 37A is inserted between the upper guide roller 54 and the lower guide roller 55.

Canceling the closing power applied to the upper and lower casings 11 and 12 allows the upper casing 11 and the lower casing 12 to open by the pressing force of the casing spring 73 (see FIG. 5). The opening of the upper and lower casings 11 and 12 causes the gear 57 and the pivot 35 (shown in FIG. 5) to turn together, and the turn of the gear 57 is transferred to the gear of support axis 55A (see FIG. 13(B)) through the idle gear group (not illustrated in the figure).

Accordingly, the support axis 55A turns and the lower guide roller 55 turns. The turn of the lower guide roller 55 is transferred to the upper guide roller 54, and the upper guide roller 54 turns. The rotation of the upper and lower guide rollers 54 and 55 conveys the unnecessary piece 37B of the glass fiber portion 37A that has been inserted between the upper and lower guide rollers 54 and 55 into the container 46 so that the unnecessary piece 37B is led into the containing part 24 surely.

As described above, in the fiber cleaver 10, because the cutter 20 is caused to move by the resilient force of the elastic member or spring 21 when the glass fiber portion 37A is cleaved, the cutter 20 can be moved at a constant movement speed regardless of the kind of an operator that operates the cleaver 10 so that the cleaved surface of the glass fiber portion 37A can be made constant. Also, the cutter 20 can be moved without taking much time and accordingly can help to shorten the time required for the cleaving work of the glass fiber portion 37A. This is advantageous for performing cleaving work at a high location.

According to the present invention, it is not always necessary to have a structure in which the breaker 16 is used for cleaving work. That is, the fiber cleaver may be structured such that by adjusting the height of the cutter 20 for cutting the glass fiber portion 37A, the cutter 20 can be made to enter into the glass fiber portion 37A deeply, and on the way where the cutter 20 is caused to move toward the right side surface 27B by the resilient force of the elastic member or spring 21, the cutter 20 cleaves the glass fiber portion 37A.

Also, it is possible to have a structure in which the one end portion 31 of the upper casing 11 can partially be removable. Moreover, the upper casing 11 may be provided with a strap hole 67 through which a strap 66 is inserted. Besides, there is no limitation to the material, shape, size, form, number, and arrangement of the parts described above as examples in the implements of the present invention, such as the upper and lower casings 11 and 12, the upper holding member 15, the breaker 16, the lower holding member 18, the cutter 20, the elastic members or springs 21, 49, and 73, the slider engaging member 22, the holder engaging part 23, the containing part 24, the cover 47, the cam 51, and so on. They are optional, provided that the present invention can be achieved with them.

A fiber cleaver according to a second embodiment of the present invention will be described hereinafter. FIG. 16 is a side view of a fiber cleaver according to the second embodiment of the present invention, and FIG. 17 is a plan view thereof. This fiber cleaver has one pair of an upper holding part 101 and a lower holding part 102 which are arranged so as to fix a glass fiber inserted between them. In addition, the fiber cleaver has a cutter 103, which is provided between the upper and lower holding parts 101 and 102, for putting a scratch to the glass fiber, and a block 104 for cutting the glass fiber by applying a force to the part that includes the scratch.

Moreover, the cleaver 100 has a storage part 105 for containing unnecessary glass fiber pieces that have been cut away, and a cover 106 thereof. The main unit body 107 of the cleaver is provided with a holder engaging part 108 to which a holder holding an optical fiber therein is to be mounted. The holder engaging part 108 include two holder engaging members 109 and 1.10 which are provided in a manner such that they can protrude in the holder engaging part 108. The holder engaging members 109 and 110 are structured so as to be pushed from a pivotable direction thereof by a spring (not illustrated in the figure) to fix the holder in a direction substantially parallel to the movement direction of the cutter 103. Thus, the holder engaging members 109 and 110 have a function similar to that of the holder engaging members shown in FIG. 1.

Also, in this embodiment, any type of holder can be used, provided that the holder is suitable for the holder engaging part 108 of the cleaver 100; for example, the holder shown in FIGS. 1 and 15 can be used. In order to mount and fix the holder to the holder engaging part 108, one or both of the holder engaging members 109 and 110 are pushed inside as the case may be and the holder is mounted in the holder engaging part 108. In the case where the length of the optical fiber protruding from the tip of the holder is short, the holder is held and fixed by both of the holder engaging members 109 and 110, and the tip of the holder is regulated at the position by a position regulating part 111. When the length of the optical fiber protruding from the tip of the holder is long, the holder is held and fixed with only the holder engaging member 110, while the tip of the holder is regulated at the position by the holder engaging member 109.

For cleaving the glass fiber portion of an optical fiber, first the holder is mounted in the holder engaging part 108. Next, an operator manually closes a cover 112 provided in the upper part of the main unit body 107 so that the glass fiber portion is held by two upper holding parts 101 and 102 which are provided in the cover 112. Next, the cutter 103 provided between one pair of the holding part 101 and 102 is moved manually by an operator so as to cross the glass fiber portion at a right angle such that an initial scratch is afforded to a surface of the glass fiber portion. Subsequently, the breaker 104 is caused to press the part including the initial scratch so that the initial scratch is developed to break the glass fiber portion at the point of the initial scratch.

The closing of the cover 106 causes the unnecessary piece broken out of the glass fiber portion to be inserted between an upper guide roller 113 and a lower guide roller 113. In this condition, an operator turns the upper and lower guide rollers 113 manually to convey the unnecessary piece thus inserted between the upper and lower guide rollers 113 to the storage part 105.

FIG. 18 is a perspective view of a fiber cleaver according to a third embodiment of the present invention. A cleaver 150 has a cover 151 including two upper holding parts 152 and 153. A main body 154 has two holding members 155 and 156 which are provided at the position corresponding to the upper holding parts 152 and 153 and a cutting blade C is arranged between them.

Also, a holder engaging part 158 for mounting a holder 157 therein is formed in the main body 154. In the holder engaging part 158, two holder engaging members 159 and 160 protrude, being pressed by a spring (not illustrated in the figure) in a direction in which the holder 157 is pushed. In the case where the length of the optical fiber 161 protruding from the tip of the holder 157 is short, the holder is disposed in the holder engaging part 158 by pushing the two holder engaging members 159 and 160 inside against the pressing force applied by the spring such that the-tip face 162 of the holder 157 abut the tip wall (not illustrated in the figure) of the holder engaging part 158, thereby regulating the position. When the length of the optical fiber 161 protruding from the tip of holder 157 is long, the holder 157 is held and fixed by the holder engaging member 160, and the position of the holder 157 is regulated by the holder engaging member 159.

In order to cut the glass portion of an optical fiber by this cleaver, the holder 157 is held and fixed in the holder engaging part 158, and the cover 151 is put down toward the main body 154 so that the glass fiber can be fixed by the upper holding parts 152 and 153 and the lower holding parts 155 and 156. Since the holding surface of the lower holding part 155 is formed in a slope, the glass fiber can be maintained in a stretched condition by absorbing the bend of the glass fiber with the slope. After a scratch is put to the glass fiber by moving the cutting blade C in a direction perpendicular to the glass fiber, the glass fiber is cleaved by hitting with a pressing block 163.

All disclosures including the specifications, claims, drawings, and abstract of Japanese patent application 2004-073028 (the application filed on Mar. 15, 2004) and Japanese patent application 2004-130280 (the application filed on Apr. 26, 2004) are incorporated by reference herein in their entirety.

INDUSTRIAL APPLICABILITY

A fiber cleaver of the present invention is suitable for work performed in a narrow space or at a high location as well as work performed on a table.

BRIEF DESCRIPTION OF THE DRAWINGS

[FIG. 2] A right side view of the fiber cleaver of the first embodiment of the present invention.

[FIG. 3] A left side view of the fiber cleaver of the first embodiment of the present invention.

[FIG. 4] A rear view of the fiber cleaver of the first embodiment of the present invention.

[FIG. 5] A sectional view of the fiber cleaver of the first embodiment of the present invention, which illustrates a condition where the upper and lower casings are opened.

[FIG. 6] A figure similar to FIG. 5 and the figure illustrates a condition in which the upper and lower casings are closed.

[FIG. 7] A sectional view of the fiber cleaver taken along a line VII-VII of FIG. 2.

[FIG. 9] A sectional view of the fiber cleaver taken along a line IV-IV of FIG. 2.

[FIG. 10] Sectional views of a holding member for holding a glass fiber portion: (A) shows an opened condition; (B) shows a closed condition; and (C) shows a condition where glass fiber portions are held in the holding member.

[FIG. 11] Schematic diagrams illustrating a first function of a fiber cleaver of the present invention.

[FIG. 12] Schematic diagrams illustrating a second function of a fiber cleaver of the present invention.

[FIG. 13] Schematic diagrams illustrating a third function of a fiber cleaver of the present invention.

[FIG. 14] Schematic diagrams illustrating the operation of a slider: (A) shows a fastened condition; (B) shows a condition where fastening is released; and (C) shows a condition where the slider has moved to a retracting position.

[FIG. 15] Schematic diagrams illustrating conditions in which a holder is held in the holder engaging part of a fiber cleaver of the present invention.

[FIG. 16] A side view of a fiber cleaver according to a second embodiment of the present invention.

[FIG. 17] A front view of the fiber cleaver according to the second embodiment of the present invention.

[FIG. 18] A perspective view of a fiber cleaver according to a third embodiment of the present invention.

[FIG. 19] A side view of a conventional fiber cleaver.

[FIG. 20] A partial enlarged view illustrating an operation mechanism of a holder engaging member.

DESCRIPTION OF REFERENCE NUMERALS

Figure 1:
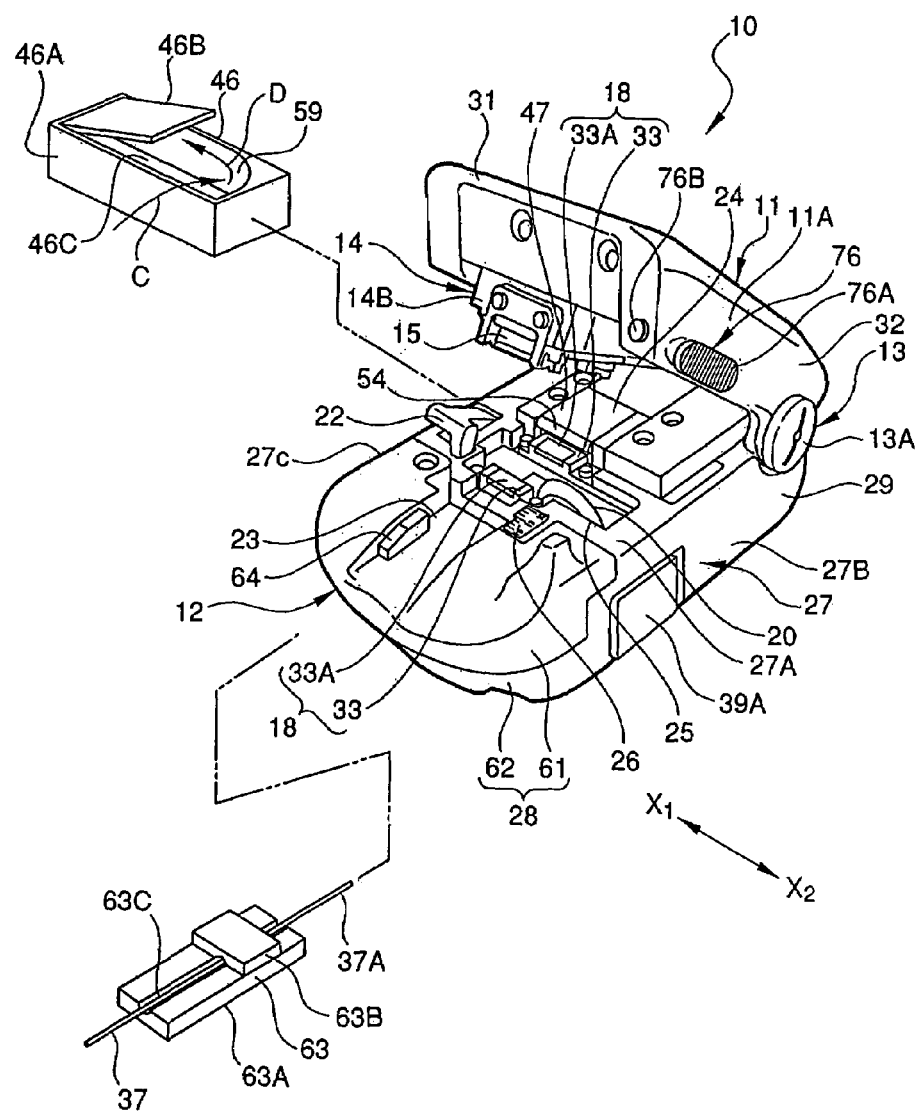
[FIG. 1] A plan view of the fiber cleaver according to the second embodiment of the present invention.
Figure 8:
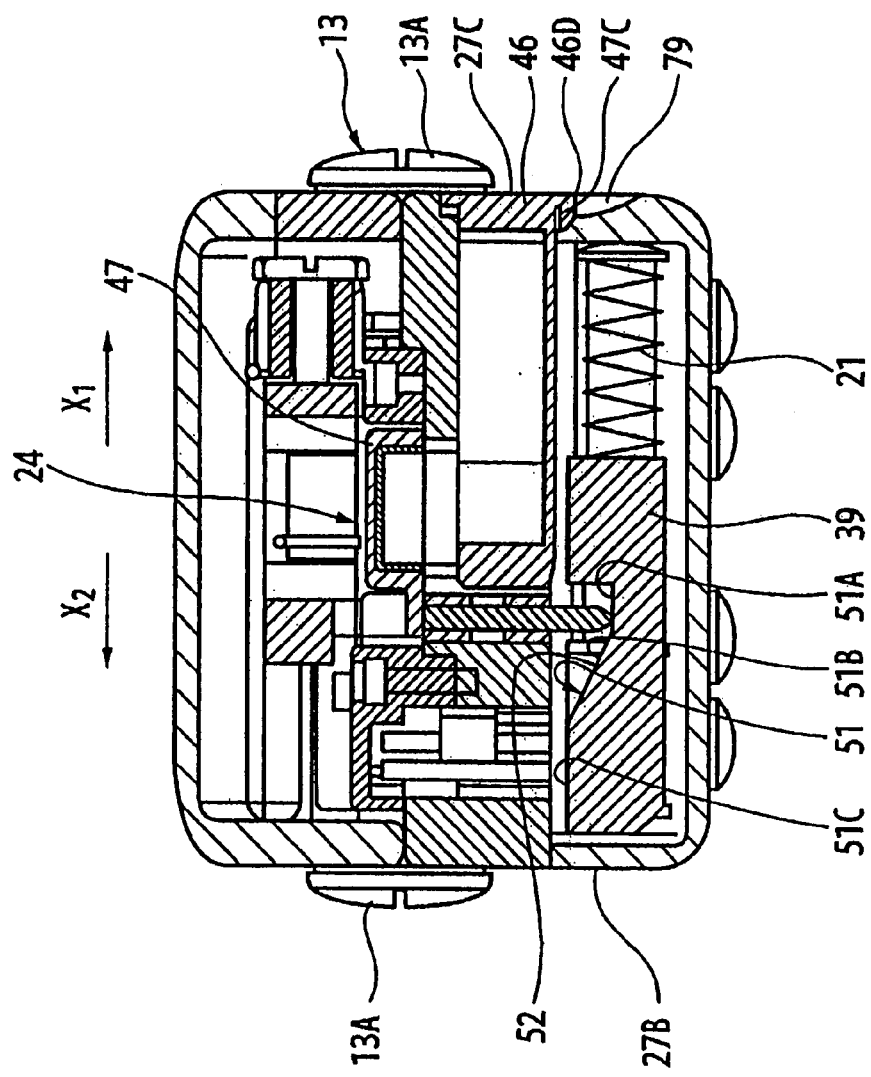
[FIG. 8] A sectional view of the fiber cleaver taken along a line VIII-VIII of FIG. 2.

10: fiber cleaver
11: upper casing
12: lower casing
13: pivot member
15: upper holding member (holding member)
16: breaker
18: lower holding member (holding member)
20: cutter
21, 49, 73: elastic member or spring
22: slider engaging member
23: holder engaging part
24: containing part
28: one end portion of a lower casing
29: other end portion of a lower casing
31: one end portion of an upper casing
32: other end portion of an upper casing
33: lower holding part (holding part)
35: pivot
37: optical fiber
37A: glass fiber portion
37B: unnecessary piece
37C: scratch
46: container
47: cover
51: cam 54, 55: guide roller
59: curved portion
63: holder
64: holder engaging member
66: strap
71: upper holding part (holding part)
76: lock

The invention claimed is:

1. A fiber cleaver comprising:
a holding member for holding a glass fiber portion of an optical fiber;
a cutter for affording a scratch to the glass fiber portion held by the holding member;
an elastic member or spring for moving the cutter; and
a slider engaging member for maintaining the elastic member or spring in a state of elastic deformation.

2. A fiber cleaver according to claim 1,
further comprising a holder engaging part for holding a holder that holds an optical fiber at its part having a protective covering.

3. A fiber cleaver according to claim 1,
further comprising a containing part for containing unnecessary pieces that have been cut away from the glass fiber portions.

4. A fiber cleaver according to claim 3,
further comprising guide rollers for conveying the unnecessary cut-away pieces into the containing part.

5. A fiber cleaver according to claim 3,
wherein the containing part has a cover that can open and shut in a manner synchronous with the movement of the cutter.

6. A fiber cleaver according to claim 5,
wherein the containing part has an elastic member or spring for pushing the cover in a closing direction and a cam for causing the cover to open and shut synchronously with the movement of the cutter.

7. A fiber cleaver according to claim 6,
wherein the cam has a form that allows the cover to close after a glass fiber has been cleaved.

8. A fiber cleaver according to claim 3,
wherein the containing part has a container that can be removed from the fiber cleaver.

9. A fiber cleaver according to claim 8,
wherein the container has a curved portion for leading unnecessary cut-away pieces backward in the container.

10. A fiber cleaver according to claim 8,
wherein the container has an adhesive provided on the inner bottom surface thereof.

11. A fiber cleaver according to claim 1, further comprising an upper casing, a lower casing, and a pivot member pivotably connecting the upper casing and the lower casing.

12. A fiber cleaver according to claim 11,
wherein the holding member comprises an upper holding member provided in the upper casing and a lower holding member provided in the lower casing, the lower holding member being arranged opposite to the upper holding member.

13. A fiber cleaver according to claim claim 11,
wherein the cutter, the elastic member or spring, the slider engaging member, holder engaging part, and the containing part are arranged in the lower casing.

14. A fiber cleaver according to claim 11, wherein the slider engaging member is structured such that the elastically deformed condition of the elastic member or spring is released by closing the upper casing and the lower casing.

15. A fiber cleaver according to claim 11, wherein the glass fiber portion can be inserted between the upper casing and the lower casing from a position opposite to the pivot member toward the pivot member side.

16. A fiber cleaver according to claim 11, wherein the fiber cleaver is structured such that the glass fiber portion is disposed in a direction perpendicular to the pivot of the pivot member.

17. A fiber cleaver according to claim 11, further comprising an elastic member or spring for pushing the upper casing and the lower casing in an opening direction.

18. A fiber cleaver according to claim 11, further comprising a lock for maintaining the upper casing and the lower casing in a closed condition.

19. A fiber cleaver according to claim 11, wherein at least one of the ends of the upper casing and the lower casing is removable.

20. A fiber cleaver according to claim 11, wherein at least one of the upper casing and the lower casing has a hole through which a strap can be inserted.

21. A fiber cleaver according to claim 11, wherein the upper casing and the lower casing are made of magnesium or aluminum.

22. A fiber cleaver comprising:
a holding member for holding a glass fiber portion of an optical fiber;
a cutter for affording a scratch to the glass fiber portion held by the holding member; and
a holder engaging part for holding a holder that holds an optical fiber at its part having a protective covering, wherein the holder engaging part has a first holder engaging member for pushing and holding the holder in a direction parallel to a movement direction of the cutter.

23. A fiber cleaver according to claim 22, further comprising a second holder engaging member provided in the holder engaging part, the second holder engaging member being capable of not only holding the holder by pushing it in a direction parallel to a movement direction of the cutter, but also setting the holder position in a direction perpendicular to the movement direction of the cutter.

24. A fiber cleaver according to claim 23,
wherein the first holder engaging member and the second holder engaging member are structured to be pushed from the direction of the pivotal movement thereof.

25. A fiber cleaver according to claim 23, wherein the first holder engaging member and the second holder engaging member are chamfered.

26. A fiber cleaver according to claim 23, wherein the first holder engaging member and the second holder engaging member are made of resin.

* * * * *